US011107652B2

(12) United States Patent
Ramesh

(10) Patent No.: US 11,107,652 B2
(45) Date of Patent: Aug. 31, 2021

(54) CIRCUIT BREAKER FOR GAS INSULATED SWITCHGEAR

(71) Applicant: Nuventura GmbH, Berlin (DE)

(72) Inventor: Manjunath Ramesh, Berlin (DE)

(73) Assignee: NUVENTURA GMBH, Berlin (DE)

( * ) Notice: Subject to any disclaimer, the term of this patent is extended or adjusted under 35 U.S.C. 154(b) by 0 days.

(21) Appl. No.: 16/631,412

(22) PCT Filed: Feb. 23, 2018

(86) PCT No.: PCT/EP2018/054603
§ 371 (c)(1),
(2) Date: Jan. 15, 2020

(87) PCT Pub. No.: WO2019/025032
PCT Pub. Date: Feb. 7, 2019

(65) Prior Publication Data
US 2020/0211799 A1  Jul. 2, 2020

(30) Foreign Application Priority Data

Aug. 3, 2017 (EP) ..................................... 17184771

(51) Int. Cl.
*H01H 33/60* (2006.01)
*H01H 33/666* (2006.01)
*H01H 33/02* (2006.01)
*H02B 7/01* (2006.01)

(52) U.S. Cl.
CPC ...... *H01H 33/6661* (2013.01); *H01H 33/022* (2013.01); *H02B 7/01* (2013.01); *H01H 2033/6665* (2013.01)

(58) Field of Classification Search
CPC ............. H01H 33/6661; H01H 33/022; H01H 2033/6665; H01H 33/666; H01H 33/6606;
(Continued)

(56) References Cited

U.S. PATENT DOCUMENTS

2012/0228267 A1   9/2012 Yoshida et al.
2014/0042125 A1*  2/2014 Matsunaga .............. H01H 9/08
                                              218/139

FOREIGN PATENT DOCUMENTS

DE         1980430            3/1968
EP         0678956 A1        10/1995
(Continued)

OTHER PUBLICATIONS

EPO, Annexed pages of Office Action for EP Application No. 17184771.8, dated Sep. 26, 2018.
(Continued)

*Primary Examiner* — Mandeep S Buttar
(74) *Attorney, Agent, or Firm* — Hodgson Russ LLP

(57) ABSTRACT

The invention refers to a circuit breaker (300A) comprising a vacuum interrupter (301) for a gas insulated switchgear. Moreover, the invention refers to a gas insulated switchgear comprising at least one circuit breaker (300A) and/or a disconnector pole. The circuit breaker (300A) has a vacuum interrupter (301) comprising a first movable contact (302), a second stationary contact (303) and a first center axis (304). Moreover, the circuit breaker (300A) comprises a first insulator (305), a contact unit (306) arranged at the first insulator (305), wherein the first movable contact (302) can be moved towards the contact unit (306) so as to be connected to the contact unit (306), an electrical conducting unit (307) comprising a first side (308) and a second side (309), wherein the first side (308) and the second side (309) are opposite to each other, wherein the vacuum interrupter (301) is arranged at the first side (308) of the electrical conducting unit (307), and a second insulator (310) wherein the second insulator (310) is arranged at the second side (309) of the electrical conducting unit (307), wherein the second insulator (310) is connected to the second stationary contact (303), wherein the second insulator (310) has a
(Continued)

second center axis (311), and wherein the second center axis (311) of the second insulator (310) is parallel to or collinear with the first center axis (304) of the vacuum interrupter (301).

19 Claims, 14 Drawing Sheets

(58) Field of Classification Search
CPC ... H01H 2033/6623; H01H 2033/6667; H01H 1/5822; H01H 33/66; H01H 2003/323; H01H 2033/6668; H01H 2033/66246; H01H 33/02; H02B 7/01
USPC ........ 361/618, 612, 604, 619, 605, 601, 634
See application file for complete search history.

(56) References Cited

FOREIGN PATENT DOCUMENTS

| | | |
|---|---|---|
| EP | 0824262 | 2/1998 |
| FR | 2846802 A1 | 5/2004 |
| GB | 2272999 A | 6/1994 |
| JP | S56122233 | 9/1981 |
| JP | 2000228806 | 8/2000 |
| JP | 2008160983 | 7/2008 |
| WO | 2007023113 A1 | 3/2007 |
| WO | 2011104915 | 9/2011 |
| WO | 2016111191 | 7/2016 |

OTHER PUBLICATIONS

International Search Report issued in connection with PCT Application No. PCT/EP2018/051603 dated Aug. 2, 2018.
European Search Opinion issued in connection with application No. 17184771.8 dated Jan. 24, 2018.
European Search Report issued in connection with application No. 17184771.8 dated Jan. 17, 2018.
JPO, Office Action for JP Application No. 2020-505446, dated Jun. 8, 2021.

* cited by examiner

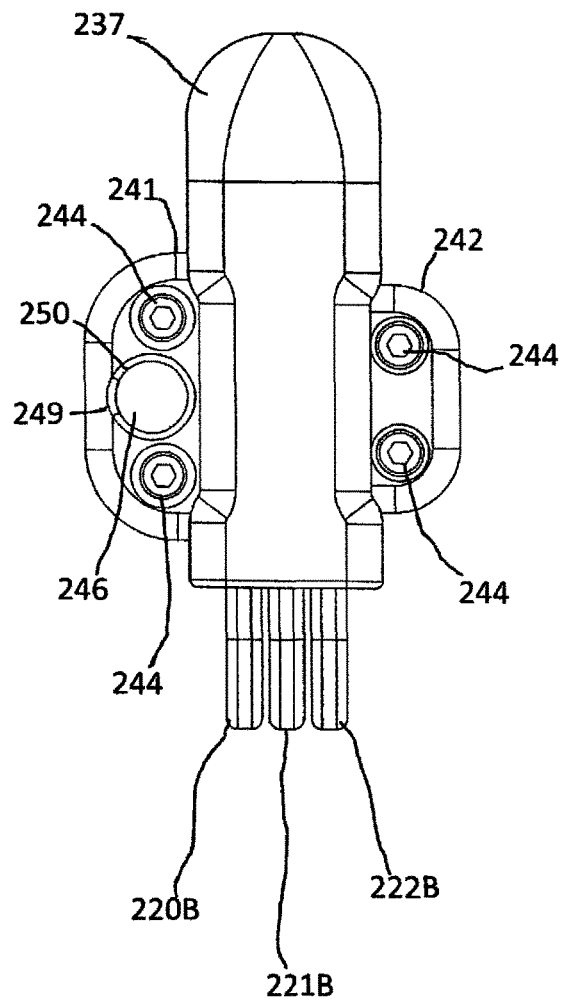
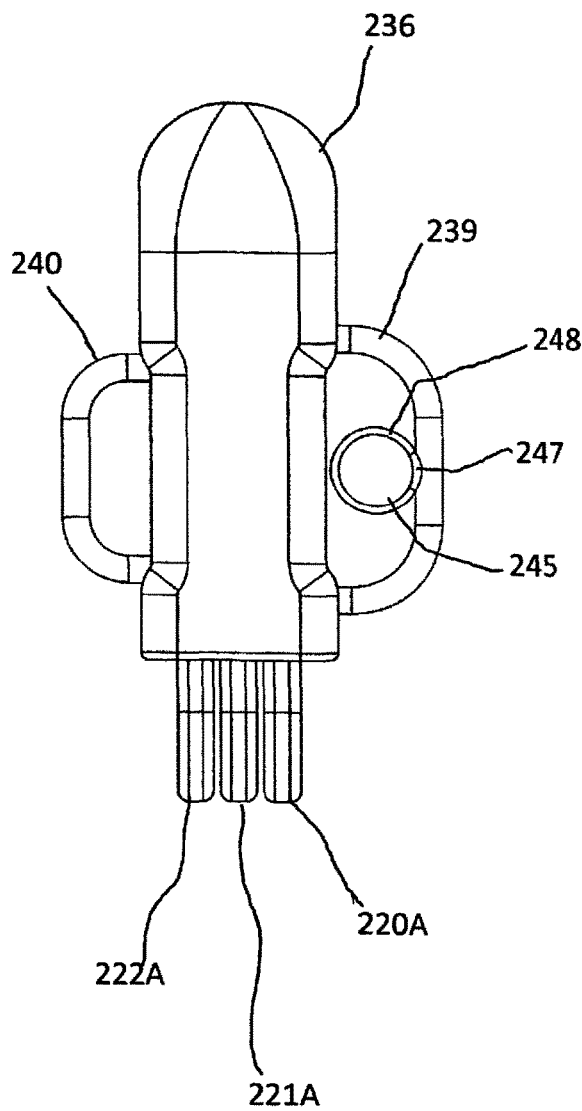
Fig. 8
Fig. 9

CIRCUIT BREAKER FOR GAS INSULATED SWITCHGEAR

CROSS-REFERENCE TO RELATED APPLICATIONS

This is a 35 U.S.C. 371 National Stage Patent Application of International Application No. PCT/EP2018/054603, filed Feb. 23, 2018, which claims priority to European application 17184771.8, filed Aug. 3, 2017, each of which is hereby incorporated by reference in its entirety.

TECHNICAL FIELD

The invention refers to a circuit breaker comprising a vacuum interrupter for a gas insulated switchgear. Furthermore, the invention refers to an electrical contact system for a circuit breaker. Moreover, the invention refers to a gas insulated switchgear comprising at least one aforementioned circuit breaker and/or at least one disconnector pole, in particular a disconnector unit, and/or at least one aforementioned electrical contact system for the circuit breaker.

BACKGROUND OF THE INVENTION

A switchgear serves as an interface in an electrical supply and an electrical load. A known switchgear for medium voltage, for example 1 kV to 52 kV, and/or high voltage, for example 52 kV to 1,200 kV, is usually a gas insulated switchgear (GIS). The known GIS comprises a cable compartment, a busbar compartment, a gas exhaust duct, a low voltage compartment and a gas insulated tank.

The cable compartment is a part of the GIS in which underground electric cables are connected to the GIS. The cable compartment is also used to connect electrical loads, such as generators, transformers and other loads, to each other. Moreover, the cable compartment may comprise current transformers and voltage transformers.

The busbar compartment of the GIS comprises busbars. A busbar is typically a copper or aluminum electrical conductor which is used to connect the GIS to other electrical equipment such as generators, transformers and electrical loads. The busbar is arranged, for example, in the gas insulated tank or is insulated by using a solid insulation covering or encapsulating the busbar.

The gas exhaust duct of the GIS comprises an exhaust path for the removal of hazardous and hot gases generated in case of any fault or abnormal condition within the GIS. The exhaust path is connected to the outside environment using ducts.

The low voltage compartment of the GIS comprises control equipment such as relays, auxiliary switches and actuators typically operating at low voltages (less than 1 kV).

The gas insulated tank of the known GIS comprises a circuit breaker and a disconnector unit, for example for one phase, for two phases or for three phases. The circuit breaker is connected to a first electric conductor guided into the gas insulated tank. The disconnector unit is used for connecting or disconnecting the circuit breaker to a second electric conductor such as a busbar guided to the busbar compartment or the cable compartment in no-load-conditions only. The disconnector unit is used for electrical isolation and grounding during service and maintenance of the GIS. The disconnector unit may comprise three disconnector poles which are movable between two or three contact positions in which they are connected or disconnected to (i) the busbar, (ii) ground or (iii) are disconnected from both. A current path may be provided from the first electric conductor to the second electric conductor by the circuit breaker and the disconnector unit. The circuit breaker and the disconnector unit are connected in series. The circuit breaker is operated to break the current during a normal load condition as well as during a failure in a voltage network in which the known GIS is used. The failure may be a high surge current due to a short circuit or due to lightning strike to the voltage network.

The vacuum interrupter is part of the circuit breaker. A known vacuum interrupter comprises a first movable contact and a second stationary contact. A body of the known vacuum interrupter is arranged between the first movable contact and the second stationary contact. The first movable contact is movable in an open position and in a closed position by an actuating mechanism. The first movable contact contacts a contact unit of the GIS in the closed position.

Since contacting and breaking occurs inside the contact of the known vacuum interrupter, full voltage will be applied to the contact. Hence, the assembly of the vacuum interrupter in a circuit breaker known in the prior art involves a complex polymeric holding device to hold the known vacuum interrupter at the right position and allows the first movable contact to be opened and to be closed during the operation. Usually, an insulating housing is used which holds the two ends of the vacuum interrupter and which allows a movable contact operation in linear direction along the axis of the vacuum interrupter.

Complex moulded metal contacts are used both on the first movable contact and on the second stationary contact of the known vacuum interrupter to allow for fixation of an insulating structure and to avoid dielectric problems that may arise in such assemblies. The close proximity of such an insulating structure can further raise the electric field around the vacuum interrupter leading to dielectric issues. The known arrangement of an insulating structure holds the vacuum interrupter at both, the first movable contact and the second stationary contact from one of the sides perpendicular to the axis of the vacuum interrupter. Sometimes, the insulating structure may also be parallel to the axis of the vacuum interrupter axis. However it may include a complex arrangement.

The support insulating structure of the circuit breaker known in the prior art comprises polymeric moulded components which are complex and made for a specific arrangement. Polymeric supports are always arranged adjacent of a vacuum interrupter axis and, therefore, are arranged next to the vacuum interrupter. Electrical contacts at the first movable contact of the vacuum interrupter are usually flexible copper. Additional components like electrical shielding are used at electrical contacts connecting both, the first movable contact and the second stationary contact of the vacuum interrupter.

With respect to the prior art concerning the disconnector pole, we refer to U.S. Pat. No. 9,466,955 B2, US 2014/0104758 A1 and U.S. Pat. No. 9,577,412 B2.

For the reasons laid out above, it is desirable to obtain a circuit breaker which may be less expensive and less complicated to manufacture than the circuit breaker known in the prior art, which may have less dielectric issues and which is a generic system.

SUMMARY OF THE INVENTION

According to the invention, this object is solved by a circuit breaker for a gas insulated switch gear according to claim 1. An electrical contact system for the circuit breaker according to the invention is given by the features of claim 14. A gas insulated switchgear according to the invention is given by the features of claim 16. Further features of the invention are evident from the following description, the following claims and/or the accompanying figures.

A circuit breaker according to the invention is used for a gas insulated switchgear (GIS). The circuit breaker according to the invention comprises a vacuum interrupter comprising a first movable contact, a second stationary contact and a first center axis. Moreover, the circuit breaker according to the invention comprises a first insulator and a contact unit arranged at the first insulator. The first movable contact is movable towards the contact unit so as to be connected to the contact unit. In particular, the first movable contact is moved by an actuating mechanism, for example a mechanical and/or an electronic mechanism. In one embodiment of the circuit breaker according to the invention, the first movable contact is movable in an open position and in a closed position by the actuating mechanism. The first movable contact contacts the contact unit in the closed position.

The circuit breaker according to the invention further comprises an electrical conducting unit, for example a busbar. The electrical conducting unit is an electrical conductor, in particular a metallic conductor. In an embodiment of the circuit breaker according to the invention, the electrical conducting unit is a copper and/or aluminum conductor. Furthermore, it may have a flat shape. In other words, it may have a thickness of about 1 mm to 100 mm. The electrical conducting unit of the circuit breaker according to the invention comprises a first side and a second side, wherein the first side and the second side are arranged opposite to each other. Moreover, the first side may be at a distance from the second side. The distance between the first side and the second side may be in the range of 1 mm to 100 mm, wherein the boundaries are within the aforementioned range. Moreover, the first side and the second side may be arranged parallel to each other. The vacuum interrupter of the circuit breaker according to the invention is arranged at the first side of the electrical conducting unit.

Furthermore, the circuit breaker according to the invention comprises a second insulator, wherein the second insulator is arranged at the second side of the electrical conducting unit. The second insulator is mechanically connected to the second stationary contact of the vacuum interrupter. Moreover, the second insulator has a second center axis. The second center axis of the second insulator is parallel to or collinear with the first center axis of the vacuum interrupter.

The invention simplifies the complexity of the polymeric supporting frames and metallic connections used in the prior art. A supporting insulator is arranged away from the vacuum interrupter. This enables homogeneous electric fields and a homogenous dielectric arrangement in gas insulated switchgear tanks. The arrangement according to the invention also avoids dielectric problems which may arise at the connection point between insulator components and metallic components at high voltage.

The second insulator may be directly mounted on a standard current carrying busbar structure avoiding complex casting components. The insulators used for the invention may be simple cylindrical components with modular dimensions which are readily available. Such simple solutions can reduce the cost of the structure as compared to complex moulded insulating components The circuit breaker according to the invention has the advantage that it provides for a good structural support of the vacuum interrupter, in particular due to the alignment of the second center axis to the first center axis as mentioned above. Moreover, the circuit breaker according to the invention may be less expensive to manufacture than a circuit breaker known from the prior art since the circuit breaker according to the invention does not use a complex polymeric holding device for holding the vacuum interrupter. Instead, it uses a simple alignment structure of the first center axis of the vacuum interrupter and the second center axis of the second insulator. Moreover, the circuit breaker according to the invention provides for no encapsulation or enclosure of the vacuum interrupter with a polymeric support as such or an arrangement of a polymeric support next to the vacuum interrupter. In other words, no polymeric frame surrounds the vacuum interrupter, in particular at a distance, for example, in the range of 0.1 mm to 100 mm from the vacuum interrupter. Therefore, the electric field around the vacuum interrupter is homogeneous and is less susceptible to dielectric failures.

In an embodiment of the circuit breaker according to the invention it is additionally or alternatively provided that the vacuum interrupter is a cylindrical interrupter, wherein the first center axis is a first cylindrical axis. In another embodiment of the circuit breaker according to the invention it is additionally or alternatively provided that the second insulator is a second cylindrical insulator, wherein the second center axis is a second cylindrical axis. The aforementioned embodiments have the advantage that standard components in the form of cylindrical insulators are used which are inexpensive and easy to manufacture. Therefore, the use of such cylindrical insulators reduces the cost of manufacturing the circuit breaker in comparison to the circuit breakers known from the prior art.

In a further embodiment of the circuit breaker according to the invention it is additionally or alternatively provided that the first insulator has a third center axis arranged perpendicular to the first center axis of the vacuum interrupter and to the second center axis of the second insulator. In particular, the first insulator may be a first cylindrical insulator and the third center axis may be a third cylindrical axis. These embodiments have the same advantage as mentioned above.

In an embodiment of the circuit breaker according to the invention it is additionally or alternatively provided that the first center axis of the vacuum interrupter and the second center axis of the second insulator are aligned horizontally. Additionally or alternatively, the third center axis of the first insulator may be aligned vertically.

In another embodiment of the circuit breaker according to the invention it is additionally or alternatively provided that the first insulator is arranged at a first support device. In a further embodiment of the circuit breaker according to the invention it is additionally or alternatively provided that the second insulator is arranged at a second support device. The first support device and/or the second support device may be any kind of support device which is suitable for the circuit breaker according to the invention. For example, the first support device and/or the second support device may each be a metallic plate, for example an aluminum or a steel plate.

In an embodiment of the circuit breaker according to the invention it is additionally or alternatively provided that the contact unit is arranged at an insulating push rod. The insulating push rod may have a fourth center axis, wherein the fourth center axis is parallel to the second center axis of the second insulator. Additionally or alternatively, the fourth center axis may be parallel to the first center axis of the vacuum interrupter. Moreover, the fourth center axis may be collinear with the second center axis of the second insulator and/or with the first center axis of the vacuum interrupter. The aforementioned embodiments provide in particular for a compact design of the circuit breaker according to the invention.

In another embodiment of the circuit breaker according to the invention it is additionally or alternatively provided that an intermediate plate is arranged between the electrical conducting unit and the second insulator. The intermediate plate may be a metallic plate, in particular an aluminum plate, a steel plate and/or a copper plate. In an embodiment of the circuit breaker according to the invention the intermediate plate comprises at least one through-opening. Furthermore, the electrical conducting unit comprises at least one first connecting means guided through the through-opening for arranging the intermediate plate to the electrical conducting unit. The first connecting means may be any kind of connecting means suitable for the circuit breaker according to the invention, such as a screw and/or a nut/bolt connection.

In a further embodiment of the circuit breaker according to the invention it is additionally or alternatively provided that the intermediate plate comprises at least one second connecting means. Moreover, the second insulator comprises at least one opening for inserting the second connecting means into the second insulator for arranging the intermediate plate to the second insulator. In other words, the second insulator may be fixed to the intermediate plate by the second connecting means. The second connecting means may be any kind of connecting means suitable for the circuit breaker according to the invention, such as a screw and/or a nut/bolt connection.

In an embodiment of the circuit breaker according to the invention it is additionally or alternatively provided that the intermediate plate comprises a third connecting means which is connected to the second stationary contact of the vacuum interrupter. In other words, the intermediate plate may be conductively and/or mechanically connected to the second stationary contact of the vacuum interrupter. In particular, the third connecting means may be an electrical conductor. The third connecting means may be any kind of connecting means suitable for the circuit breaker according to the invention, such as a screw and/or a nut/bolt connection.

In a further embodiment of the circuit breaker according to the invention it is additionally or alternatively provided that the contact unit is a metallic contact unit, for example a copper contact unit and/or an aluminum contact unit. Additionally or alternatively, it is provided that the first movable contact is a metallic first movable contact, for example a copper contact and/or an aluminum contact. Moreover, it is additionally or alternatively provided that the second stationary contact is a metallic stationary contact, for example a copper contact and/or an aluminum contact. Furthermore, it is additionally or alternatively provided that the electrical conducting unit is a metallic conductor, for example a copper conductor and/or an aluminum conductor.

In another embodiment of the circuit breaker according to the invention it is additionally or alternatively provided that the vacuum interrupter comprises a body arranged between the first movable contact and the second stationary contact, wherein no polymeric support or polymeric component is arranged at the body of the vacuum interrupter.

The invention also refers to an electrical contact system for a circuit breaker having a vacuum interrupter with a first movable contact, in particular the circuit breaker comprising at least one of the above mentioned or below mentioned features or having a combination of at least two of the above mentioned or below mentioned features. Therefore, the invention also refers to the circuit breaker as above or below mentioned having such an electrical contact system. The electrical contact system according to the invention comprises at least one contact unit having at least one cavity and at least one inner contact surface being adjacent to the cavity, wherein the inner contact surface surrounds at least partially the cavity. The contact unit is electrically conductive. Moreover, the contact unit is made, for example, of copper and/or aluminum. Furthermore, the electrical contact system according to the invention comprises at least one sliding contact unit, wherein the sliding contact unit comprises an outer cylindrical surface, wherein at least one flexible contact unit is arranged at the outer cylindrical surface for contacting the inner contact surface of the contact unit. The sliding contact unit is arranged at the first movable contact of the vacuum interrupter. Moreover, the sliding contact unit is electrically conductive. Moreover, the sliding contact unit is made, for example, of copper and/or aluminum. The flexible contact unit may be spring-loaded for high contact force and may comprise a silver or gold plating for increasing conductivity. The invention is not restricted to a specific number of flexible contact units. In fact, any number of flexible contact units which is suitable for the invention may be used.

In an embodiment of the electrical contact system according to the invention, it is additionally or alternatively provided that the contact unit comprises at least one outer surface being at least one of: cylindrical shape, spherical shape and oval shape. In particular, the cylindrical shape of the outer surface provides for a homogenous electrical field distribution at the outer surface of the contact unit. However, as mentioned above, the shape of the outer surface is not restricted to the cylindrical shape. Rather, the outer surface may have any shape which provides for a homogeneous electrical field. In particular, the outer surface may have an increased surface area which may increase a thermal dissipation capability.

In a further embodiment of the electrical contact system according to the invention, it is additionally or alternatively provided that the sliding contact unit is arranged at the first movable contact of the vacuum interrupter. In particular, the sliding contact unit is mounted at the first movable contact of the vacuum interrupter and is moved by the first movable contact of the vacuum interrupter.

The invention also refers to a gas insulated switchgear (GIS) comprising at least one circuit breaker having at least one of the above mentioned or below mentioned features or having a combination of at least two of the above mentioned or below mentioned features. Additionally or alternatively, the GIS may comprise at least one electrical contact system having at least one of the above mentioned or below mentioned features or having a combination of at least two of the above mentioned or below mentioned features. Additionally or alternatively, the GIS may comprise three circuit breakers having at least one of the above mentioned or below mentioned features or having a combination of at least two of the above mentioned or below mentioned features. The three circuit breakers are each used for a different phase.

BRIEF DESCRIPTION OF THE DRAWINGS

Embodiments of the invention described herein will be explained in more detail in the following text with reference to the figures, in which:

FIG. 8 shows a side view of the disconnector pole according to FIG. 4;

FIG. 9 shows a further side view of the disconnector pole according to FIG. 4;

FIG. 1 shows a schematic view of a gas insulated tank 100 of a gas insulated switchgear 1000 according to the invention. A disconnector unit 200 and a circuit breaker unit 300 are arranged in the gas insulated tank 100. The disconnector unit 200 is connected to the circuit breaker unit 300 by a first electrical conducting unit 201, a second electrical conducting unit 202 and a third electrical conducting unit 203. This will be explained in further detail below. The first electrical conducting unit 201, the second electrical conducting unit 202 and the third electrical conducting unit 203 may be any kind of conducting unit suitable for the invention. For example, at least one of the first electrical conducting unit 201, the second electrical conducting unit 202 and the third electrical conducting unit 203 is a busbar. In particular, the first electrical conducting unit 201, the second electrical conducting unit 202 and/or the third electrical conducting unit 203 is a copper and/or aluminum conductor.

Figure 2:
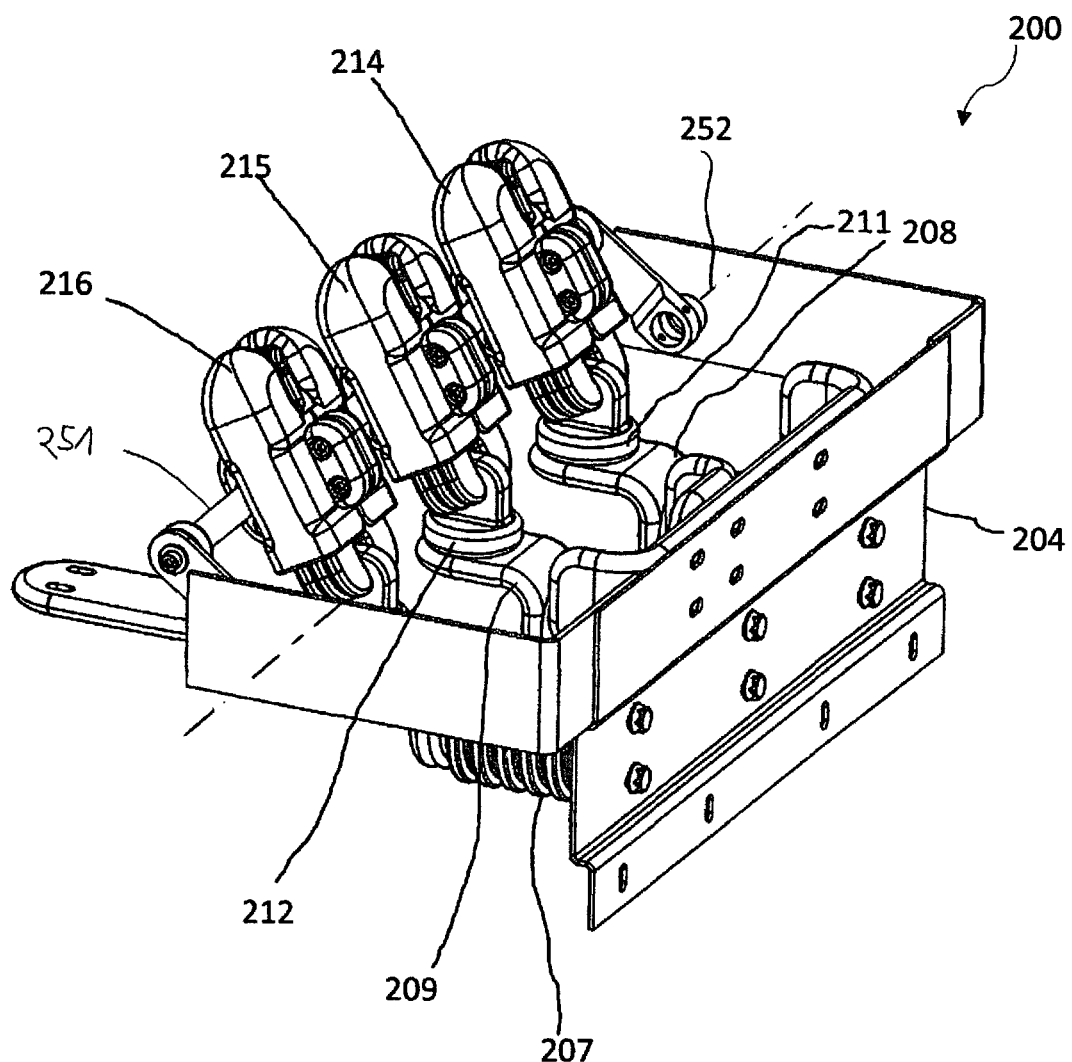
FIG. 2 shows a first schematic view of a disconnector unit.
Figure 3:
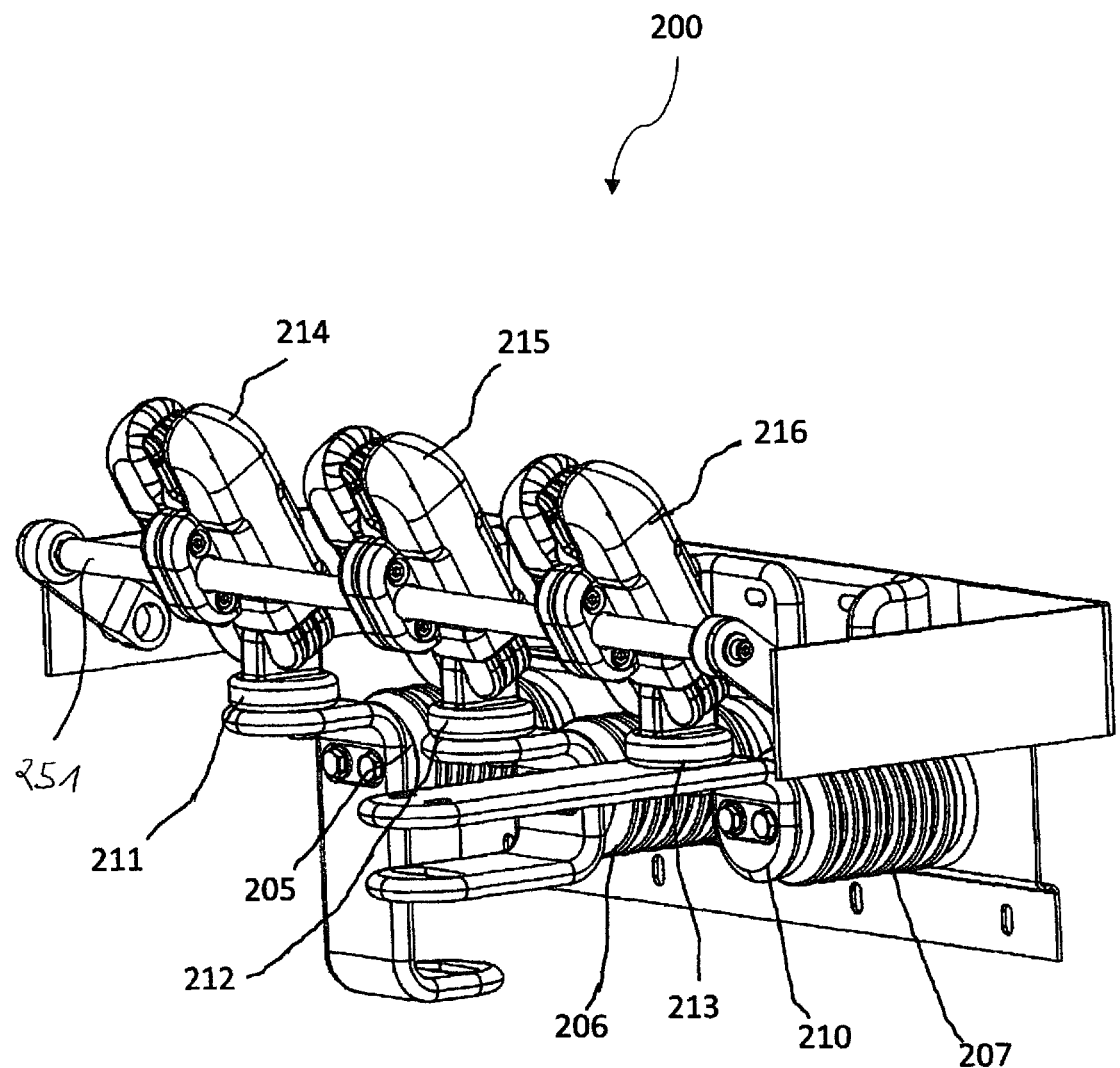
FIG. 3 shows a second schematic view of the disconnector unit according to FIG. 2.
Figure 4:
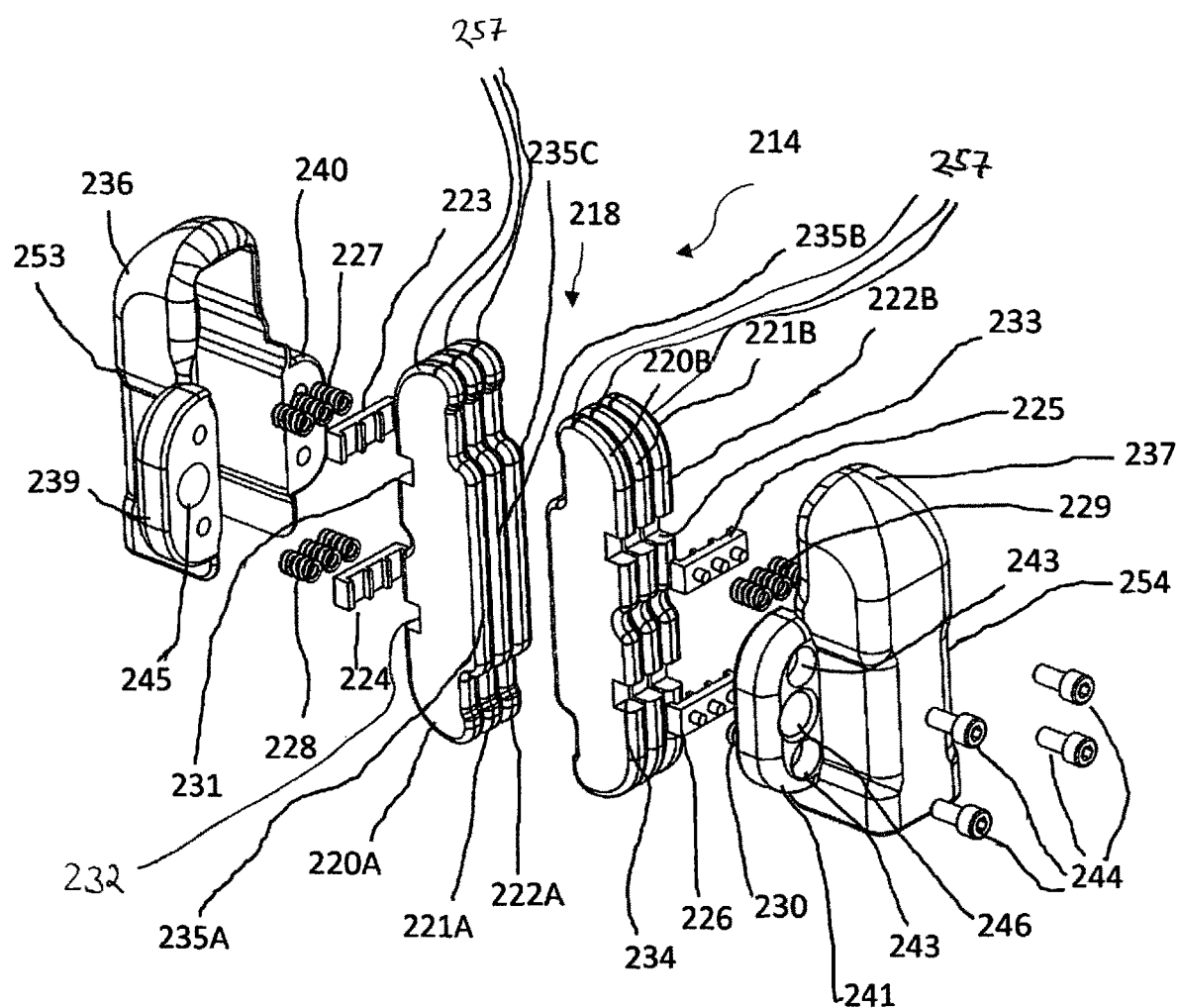
FIG. 4 shows a disassembled metallic housing and a metallic contact device of a disconnector pole.
Figure 5:
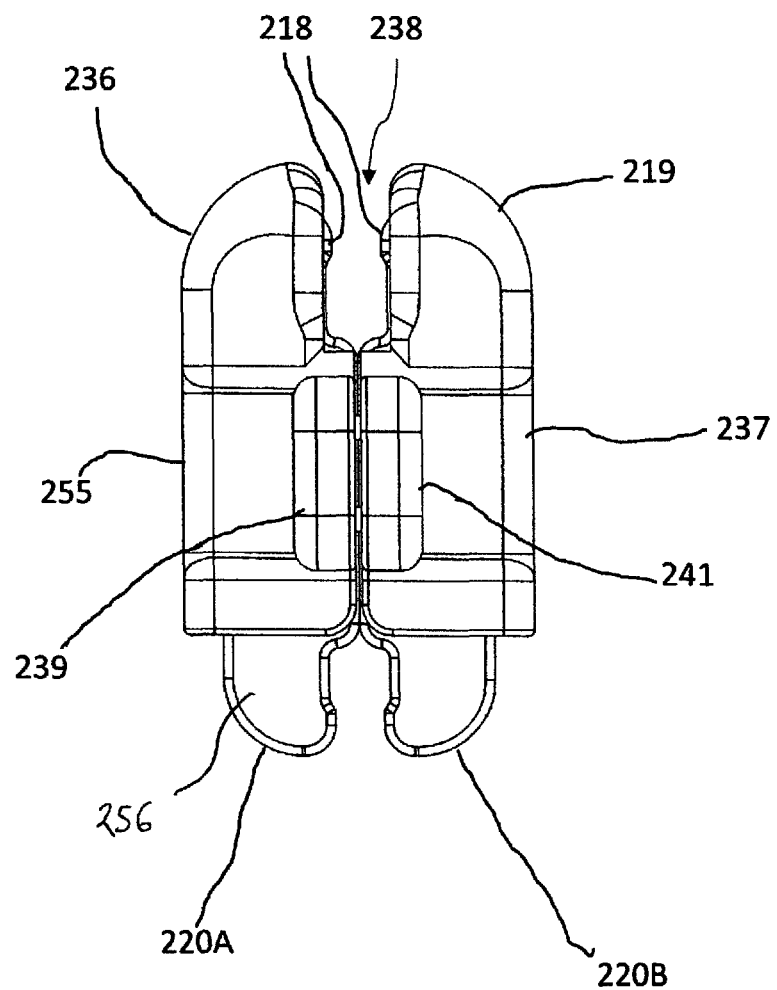
FIG. 5 shows a front view of the disconnector pole according to FIG. 4.
Figure 6:
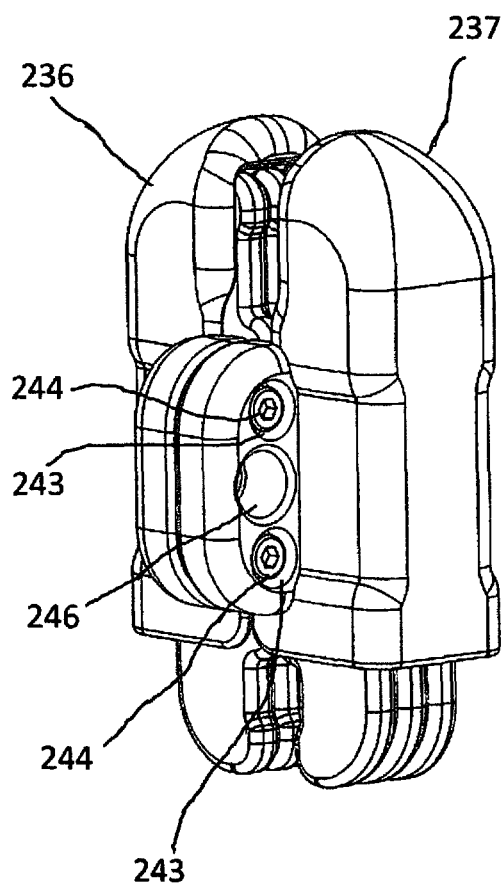
FIG. 6 shows a first schematic view of the disconnector pole according to FIG. 4.
Figure 7:
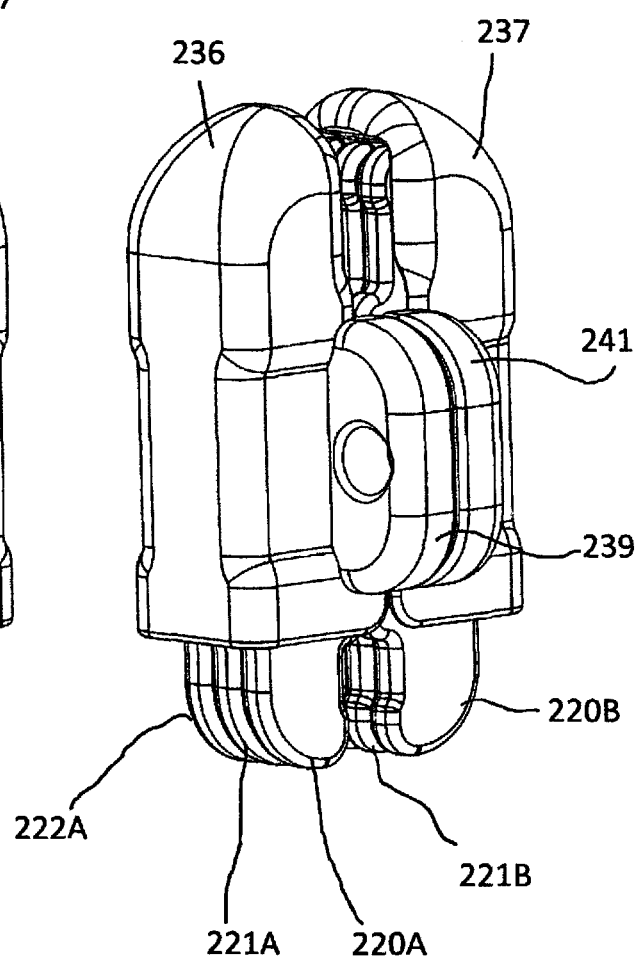
FIG. 7 shows a second schematic view of the disconnector pole according to FIG. 4.

The disconnector unit 200 according to the invention is now explained. The disconnector unit 200 is shown in particular in FIGS. 2 and 3. The disconnector unit 200 is arranged on a mounting unit 204. The mounting unit 204 may be a stainless steel sheet. A first disconnector insulator 205, a second disconnector insulator 206 and a third disconnector insulator 207 are mounted at the mounting unit 204. The first disconnector insulator 205, the second disconnector insulator 206 and the third disconnector insulator 207 may be standard cylindrical insulators known in the art.

The first disconnector insulator 205 is arranged at and is mechanically connected to a first electrical conductor 208. The first electrical conductor 208 is arranged at and is conductively connected to a first contact unit 211. A first disconnector pole 214 is arranged at and is conductively connected to the first contact unit 211. The first contact unit 211 may be a pivoting contact. In other words, the first disconnector pole 214 may be rotated around a rotation axis 252, which is aligned perpendicular to a surface of the first contact unit 211.

The second disconnector insulator 206 is arranged at and is mechanically connected to a second electrical conductor 209. The second electrical conductor 209 is arranged at and is conductively connected to a second contact unit 212. A second disconnector pole 215 is arranged at and is conductively connected to the second contact unit 212. The second contact unit 212 may also be a pivoting contact. In other words, the second disconnector pole 215 may be rotated around the above mentioned rotation axis 252, which is aligned perpendicular to a surface of the second contact unit 212.

The third disconnector insulator 207 is arranged at and is mechanically connected to a third electrical conductor 210. The third electrical conductor 210 is arranged at and is conductively connected to a third contact unit 213. A third disconnector pole 216 is arranged at and is conductively connected to the third contact unit 213. The third contact unit 213 may also be a pivoting contact. In other words, the third switch 216 may be rotated around the above mentioned rotation axis 252, which is aligned perpendicular to a surface of the third contact unit 213.

If a three phase power system is used, each of the above mentioned disconnector poles 214, 215 and 216 is used for a different phase of the current. In other words, the first disconnector pole 214 is used for a first phase of the current, the second disconnector pole 215 is used for a second phase of the current and the third disconnector pole 216 is used for a third phase of the current.

Figure 1:
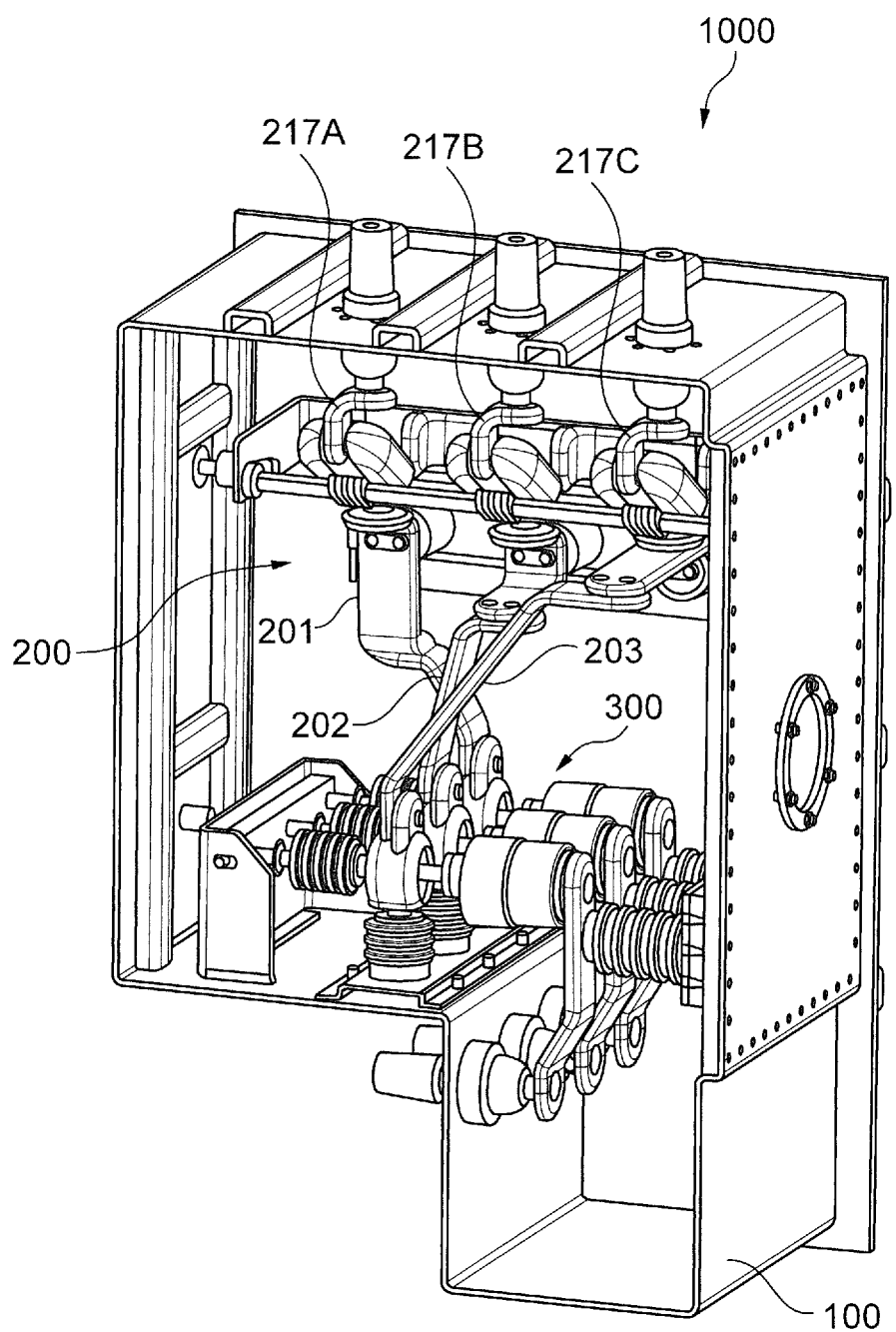
FIG. 1 shows a schematic view of a gas insulated tank of a gas insulated switchgear.

Each disconnector pole 214, 215 and 216 is movable between at least two contact positions. In the embodiment shown in FIGS. 1 to 3, each disconnector pole 214, 215 and 216 is movable between at least three contact positions. The contact positions are a first contact position, which is a connected-position (ON), a second contact position, which is a disconnected-position (OFF), and a third contact position, which is the earth position (EARTH). FIG. 1 shows a first contact 217A of the first contact position of the first disconnector pole 214, a second contact 217B of the first contact position of the second disconnector pole 215 and a third contact 217C of the first contact position of the third disconnector pole 216.

The first disconnector pole 214 is now explained in detail with respect to FIGS. 4 to 9. Since the second disconnector pole 215 and the third disconnector pole 216 are identical to the first disconnector pole 214 with respect to their structure, the following also applies to the second disconnector pole 215 and to the third disconnector pole 216.

The first disconnector pole 214 comprises a metallic contact device 218 and a metallic housing 219. The metallic contact device 218 comprises several metallic contact units, each metallic contact unit having a first part and a second part. Each metallic contact unit may be a contact finger and the arrangement of the metallic contact device 218 and the metallic housing 219 may be a finger packet. In particular, the metallic contact device 218 comprises a first metallic contact unit having a first part 220A and a second part 220B, a second metallic contact unit having a first part 221A and a second part 221B and a third metallic contact unit having a first part 222A and a second part 222B. The first part 220A and the second part 220B of the first metallic contact unit are arranged opposite each other and are conductively connected to each other at a first middle section 235A. The first part 221A and the second part 221B of the second metallic contact unit are arranged opposite each other and are conductively connected to each other at a second middle section 235B. The first part 222A and the second part 222B of the third metallic contact unit are arranged opposite each other and are conductively connected to each other at a third middle section 235C.

The first part 220A of the first metallic contact unit and the first part 221A of the second metallic contact unit are arranged opposite to each other in the metallic housing 219, wherein the first part 220A of the first metallic contact unit and the first part 221A of the second metallic contact unit touch each other or are arranged at a distance to each other. The distance is provided by holders and grooves as mentioned below. Moreover, the second part 220B of the first metallic contact unit and the second part 221B of the second metallic contact unit are arranged opposite to each other in the metallic housing 219, wherein the second part 220B of the first metallic contact unit and the second part 221B of the second metallic contact unit touch each other or are arranged at a distance to each other. The distance is provided by holders and grooves as mentioned below.

Furthermore, the first part 221A of the second metallic contact unit and the first part 222A of the third metallic contact unit are arranged opposite to each other in the metallic housing 219, wherein the first part 221A of the second metallic contact unit and the first part 222A of the third metallic contact unit touch each other or are arranged at a distance to each other. The distance is provided by holders and grooves as mentioned below. Moreover, the second part 221B of the second metallic contact unit and the second part 222B of the third metallic contact unit are arranged opposite to each other in the metallic housing 219, wherein the second part 221B of the second metallic contact unit and the second part 222B of the third metallic contact unit touch each other or are arranged at a distance to each other. The distance is provided by holders and grooves as mentioned below.

The first part 220A of the first metallic contact unit, the first part 221A of the second metallic contact unit and the first part 222A of the third metallic contact unit are arranged at a first holder 223 and a second holder 224. The first holder 223 is arranged in a first groove 231 which extends along the first part 220A of the first metallic contact unit, the first part 221A of the second metallic contact unit and the first part 222A of the third metallic contact unit. Moreover, the second holder 224 is arranged in a second groove 232 which extends along the first part 220A of the first metallic contact unit, the first part 221A of the second metallic contact unit and the first part 222A of the third metallic contact unit. The first holder 223 is biased by a first spring unit 227 comprising three coil springs arranged in a first housing part 236 of the metallic housing 219. The second holder 224 is biased by a second spring unit 228 comprising three coil springs arranged in the first housing part 236 of the metallic housing 219.

The second part 220B of the first metallic contact unit, the second part 221B of the second metallic contact unit and the second part 222B of the third metallic contact unit are arranged at a third holder 225 and a fourth holder 226. The third holder 225 is arranged in a third groove 233 which extends along the second part 220B of the first metallic contact unit, the second part 221B of the second metallic contact unit and the second part 222B of the third metallic contact unit. Moreover, the fourth holder 226 is arranged in a fourth groove 234 which extends along the second part 220B of the first metallic contact unit, the second part 221B of the second metallic contact unit and the second part 222B of the third metallic contact unit. The third holder 225 is biased by a third spring unit 229 comprising three coil springs arranged in a second housing part 237 of the metallic housing 219. The fourth holder 226 is biased by a fourth spring unit 230 comprising three coil springs arranged in the second housing part 237 of the metallic housing 219.

As mentioned above, each of the spring units 227 to 230 comprises three coil springs. However, the invention is not restricted to such a structure of the spring units. Rather, any structure of the spring units suitable for the invention may be used. For example, the spring unit may comprise any kind of compression spring and/or a circular spring and/or a leaf spring for each contact.

As shown in FIGS. 4 to 9 and as mentioned above, the metallic housing 219 of the first disconnector pole 214 comprises the first housing part 236 and the second housing part 237. An opening 238 is arranged between the first housing part 236 and the second housing part 237, wherein the metallic contact device 218 partly spans the opening 238.

The first part 220A of the first metallic contact unit, the first part 221A of the second metallic contact unit and the first part 222A of the third metallic contact unit are arranged in the first housing part 236, whereas the second part 220B of the first metallic contact unit, the second part 221B of the second metallic contact unit and the second part 222B of the third metallic contact unit are arranged in the second housing part 237.

The first housing part 236 has a first wing unit 239 and a further first wing unit 240, both wing units 239, 240 extending from a first main body 253 of the first housing part 236 in opposite directions. Moreover, the second housing part 237 has a second wing unit 241 and a further second wing unit 242, both wing units 241, 242 extending from a second main body 254 of the second housing part 237 in opposite directions. The first wing unit 239, the further first wing unit 240, the second wing unit 241 and the further second wing unit 242 each comprise connecting means for connecting the first housing part 236 to the second housing part 237. In particular, the second wing unit 241 and the further second wing unit 242 comprise countersunk formations 243 for screws 244. The countersunk formations 243 provide for an electrical shadow effect for the screws 244 and, therefore, decrease or avoid a high electric field which might be generated at the screws 244. The screws 244 are inserted into threads arranged at the first wing unit 239 and the further first wing unit 240.

The first wing unit 239 comprises a first cut-out 245, for example a circular cut-out, and the second wing unit 241 comprises a second cut-out 246, for example a circular cut-out. The invention is not restricted to circular cut-outs 245, 246 in the first wing unit 239 and in the second wing unit 241, respectively. Instead, any suitable shape of the cut-outs in the first wing unit 239 and the second wing unit 241 may be used, for example a polygonal shape. The cut-outs 245, 246 of the first wing unit 239 and the second wing unit 241, respectively, may have, for example, the shape of a triangle, a square, a pentagon or a hexagon.

The first cut-out 245 comprises a first countersunk formation 247 and the second cut-out 246 comprises a second countersunk formation 249. The first countersunk formation 247 comprises a first chamfer 248 and/or a roundness and or a cut-out. Moreover, the second countersunk formation 249 comprises a second chamfer 250 and/or a roundness and or a cut-out.

As mentioned above, the structures of the first disconnector pole 214, the second disconnector pole 215 and the third disconnector pole 216 are identical. Therefore, each disconnector pole 214 to 216 comprises the cut-outs. As shown in particular in FIGS. 2 and 3, a rod 251, for example a polymeric insulating rod, is arranged in each of the first cut-outs and each of the second cut-outs of all three disconnector poles 214 to 216. The rod 251 is shaped to match the shapes of the first cut-outs and of the second cut-outs. Therefore, the rod 251 may have, for example, a circular or a polygonal shape, such as a shape of a triangle, a square, a pentagon or a hexagon. The first disconnector pole 214, the second disconnector pole 215 and the third disconnector pole 216 are rotatable around the above mentioned rotation axis 252. The rod 251 is arranged at a distance to and parallel to the rotation axis 252 which allows to increase the number of metallic contact units (fingers) in comparison to the prior art. Moreover, using the rod 251 allows for the first disconnector pole 214, the second disconnector pole 215 and the third disconnector pole 216 to rotate around the rotation axis 252. For example, due to the presence of the rod 251, the first disconnector pole 214, the second disconnector pole 215 and the third disconnector pole 216 are movable between the three contact positions.

The rod 251 is arranged in a region having a low electric field (for example lower than 1 kV/mm at power frequency voltage), which decreases the probability of dielectric failures. Moreover, the use of the aforementioned first and second counter sunk formations 247, 249 and the use of the first and second chamfers 248, 250 decreases the number of dielectric failures caused by so called triple points, for example a high electric field generated in the insulation gas and at the region where a metallic component at high voltage is connected to a polymeric element and the insulation gas.

The metallic housing 219 has an outer surface 255 comprising smooth curvatures. For example, the outer surface 255 of the metallic housing 219 comprises a part of the outer surface 255, the part having a radius of curvature greater than 2 mm. Alternatively, the entire outer surface 255 has a radius of curvature less than 2 mm. However, the invention is not restricted to such a radius of curvature. Instead, any radius of curvature which is appropriate for the invention may be used. For example, one part of the outer surface 255 of the metallic housing 219 has a radius of curvature less than or equal to 2 mm but is positioned in an electric field shadow, whereas another part of the outer surface 255 of the metallic housing 219 has a radius of curvature greater than 2 mm.

The metallic housing 219 also comprises a surface roughness in the form of the arithmetic mean deviation $R_a$ in the range of about 0.2 μm to 100 μm, wherein the boundaries are included in that range.

The metallic housing 219 is, for example, an aluminum and/or copper and/or silver plated housing. Additionally or alternatively, the metallic contact device 219 is an aluminum and/or copper and/or silver plated contact device.

The metallic contact device 218 comprises an outer surface 256. At least 50% of the entire outer surface 256 of the metallic contact device 218 is arranged in the metallic housing 219. For example, at least 60% or at least 70% or at least 80% of the entire outer surface 256 of the metallic contact device 218 is arranged in the metallic housing 219. Moreover, the metallic housing 219 is arranged and extended in such a way that it covers the metallic contact device 218 in critical regions such as a tip of a blade 257 (see, for example, FIG. 4) and increases the radius of curvature, hereby reducing the electric field. The dielectric performance, in particular the capacity of preventing and dealing with unwanted electric discharge, is achieved by enclosing the metallic contact device 218 in the metallic housing 219.

By providing the disconnector poles 214, 215, and 216 in the gas insulated tank 100 of the GIS 1000 it is possible to reduce the quantity of an insulating gas such as $SF_6$ and, thereby, to reduce adverse environment effects from this gas. Alternatively, a more environment friendly gas having a relatively less dielectric strength can be used as an insulating gas. For example, a natural gas such as ambient air, carbon-dioxide or nitrogen may be used as the insulating gas.

As mentioned above, the invention also refers to a circuit breaker unit 300 comprising circuit breakers 300A. For example, the circuit breaker unit 300 comprises three circuit breakers 300A, namely a first circuit breaker, a second circuit breaker and a third circuit breaker. The three circuit breakers 300A have an identical structure, which is now explained.

Figure 10:
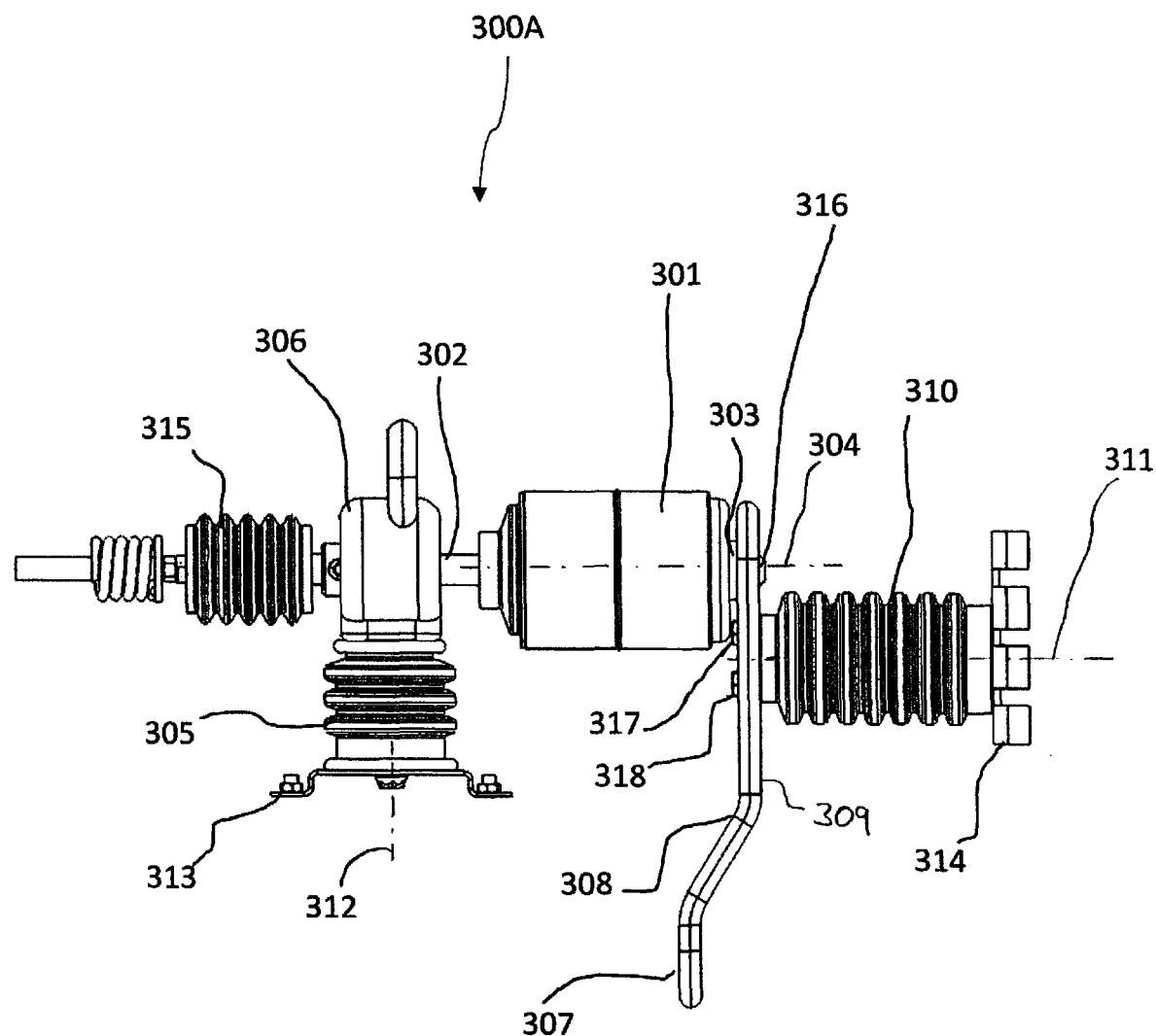
FIG. 10 shows a side view of a first embodiment of a circuit breaker.
Figure 11:
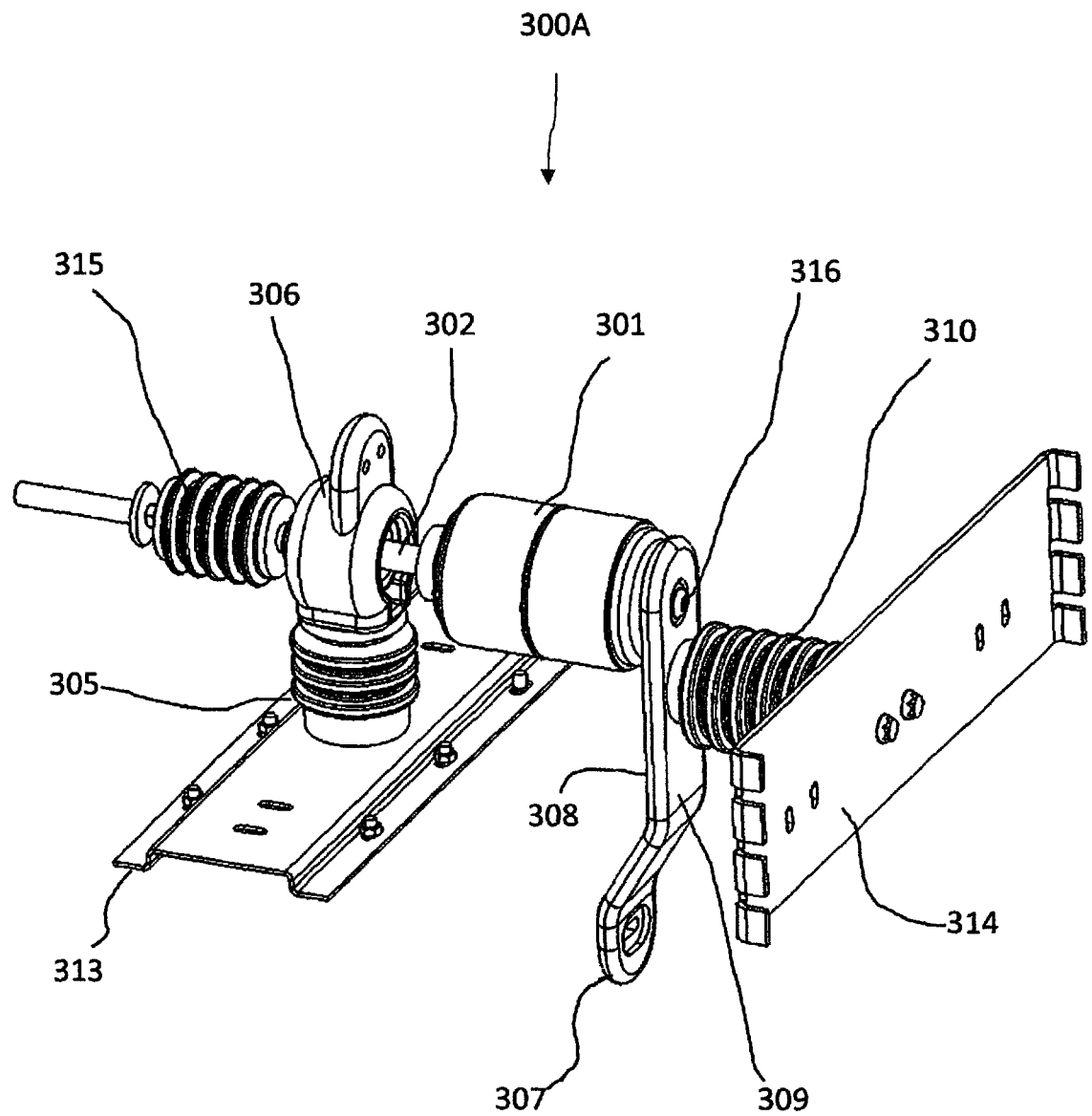
FIG. 11 shows a schematic view of the circuit breaker according to FIG. 10.
Figure 12:
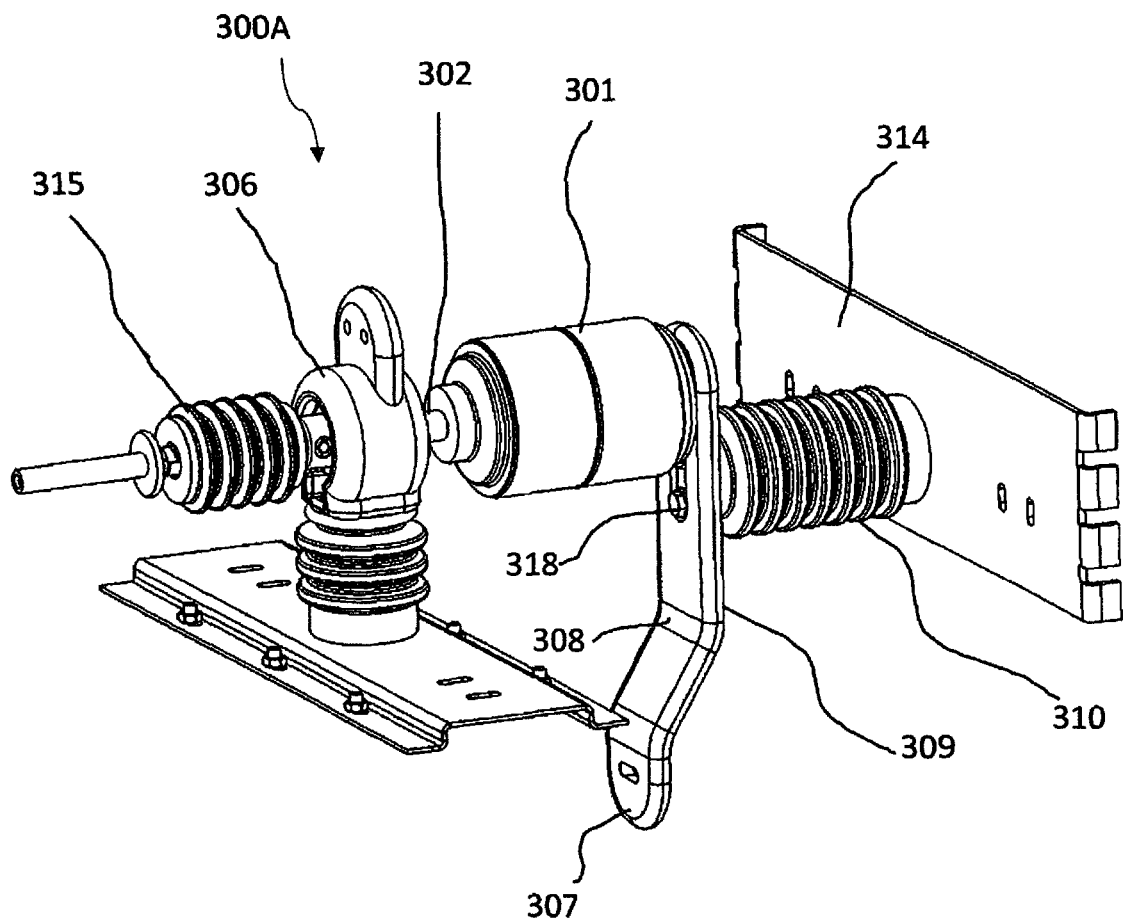
FIG. 12 shows a further schematic view of the circuit breaker according to FIG. 10.

A first embodiment of the circuit breaker 300A is shown in FIGS. 10 to 12. The circuit breaker 300A comprises a vacuum interrupter 301 comprising a first movable contact 302, a second stationary contact 303 and a first center axis 304. Moreover, the circuit breaker 300A comprises a first insulator 305 and a contact unit 306 arranged at the first insulator 305. The first movable contact 302 is movable to the contact unit 306 to be connected to the contact unit 306. The first movable contact 302 is moved by an actuating mechanism, for example a mechanical and/or an electronic mechanism (not shown in FIGS. 10 to 12). The first movable contact 302 is movable in an open position and in a closed position by the actuating mechanism. The first movable contact 302 contacts the contact unit 306 in the closed position.

The contact unit 306 is a metallic contact unit, for example, a copper unit and/or an aluminum unit. Moreover, the first movable contact 302 is a metallic movable contact, for example a copper contact and/or an aluminum contact. Furthermore, the second stationary contact 303 is a metallic stationary contact, for example a copper contact and/or an aluminum contact.

Furthermore, the circuit breaker 300A according to FIGS. 10 to 12 comprises a busbar 307. The busbar 307 is an electrical conductor, in particular a metallic conductor. For example, the busbar 307 is a copper and/or an aluminum conductor. It may have a flat shape. In other words, it may have a thickness of about 1 mm to 100 mm. The busbar 307 comprises a first side 308 and a second side 309. The first side 308 of the busbar 307 and the second side 309 of the busbar 307 are arranged opposite to each other. The first side 308 of the busbar 307 is at a distance to the second side 309 of the busbar 307. The distance between the first side 308 and the second side 309 of the busbar 307 is in the range of 1 mm to 100 mm, wherein the boundaries are within the aforementioned range. Moreover, the first side 308 and the second side 309 of the busbar 307 are arranged parallel to each other.

The vacuum interrupter 301 of the circuit breaker 300A is arranged at the first side 308 of the busbar 307. The vacuum interrupter 301 is conductively mounted to the busbar 307 using a connection means, for example a screw 316.

The circuit breaker 300A also comprises a second insulator 310. The second insulator 310 is arranged at the second side 309 of the busbar 307. The second insulator 310 is mechanically connected to the busbar 307 using a first screw 317 and a second screw 318. Accordingly, the second insulator 310 is also mechanically connected to the second stationary contact 303 of the vacuum interrupter 301.

The second insulator 310 has a second center axis 311. The second center axis 311 of the second insulator 310 is parallel to the first center axis 304 of the vacuum interrupter 301.

The vacuum interrupter 301 is a cylindrical interrupter, wherein the first center axis 304 is a first cylindrical axis. Moreover, the second insulator 310 is a cylindrical insulator, wherein the second center axis 311 is a second cylindrical axis. The first insulator 305 is also a cylindrical insulator. The first insulator 305 has a third center axis 312, namely a third cylindrical axis.

The first center axis 304 of the vacuum interrupter 301 and the second center axis 311 of the second insulator 310 are horizontally aligned. Moreover, the third center axis 312 of the first insulator 305 is vertically aligned.

The first insulator 305 is arranged at a first support device 313. Moreover, the second insulator 310 is arranged at a second support device 314. The first support device 313 and/or the second support device 314 may be any kind of support device which is suitable for the circuit breaker 300A. In particular, the first support device 313 and/or the second support device 314 may each be a metallic plate, for example a steel and/or an aluminum plate.

The contact unit 306 is also arranged at an insulating push rod 315. The insulating push rod 315 has a fourth center axis. The fourth center axis is collinear with the first center axis 304 of the vacuum interrupter 301. Therefore, the fourth center axis of the insulating push rod 315 is also parallel to the second center axis 311 of the second insulator 310.

The circuit breaker 300A has the advantage that it provides for a good structure support of the vacuum interrupter 301, in particular due to the alignment of the second center axis 311 of the second insulator 310 to the first center axis 304 of the vacuum interrupter 301. Moreover, the circuit breaker 300A may be less expensive to manufacture than the circuit breaker known from the prior art since the circuit breaker 300A according to the invention does not use a complex polymeric holding device for holding the vacuum interrupter 301. Rather, the circuit breaker 300A according to the invention uses a simple alignment structure of the first center axis 304 of the vacuum interrupter 301 and the second center axis 311 of the second insulator 310. Moreover, the circuit breaker 300A provides for no encapsulation or enclosure of the vacuum interrupter 301. Therefore, no polymeric frame or polymeric components surround the vacuum interrupter 301, in particular at a distance, for example, in the range of 0.1 mm to 300 mm from the vacuum interrupter 301. Therefore, the electric field around the vacuum interrupter 301 is homogenous and leads to less dielectric failures. Moreover, as mentioned above, cylindrical insulators are used. These are inexpensive, modular and easy to manufacture. Therefore, the use of such cylindrical insulators reduces the costs of manufacturing the circuit breaker 300A in comparison to the circuit breakers known from the prior art. Additionally, the circuit breaker 300A according to the invention has a compact design.

Figure 13:
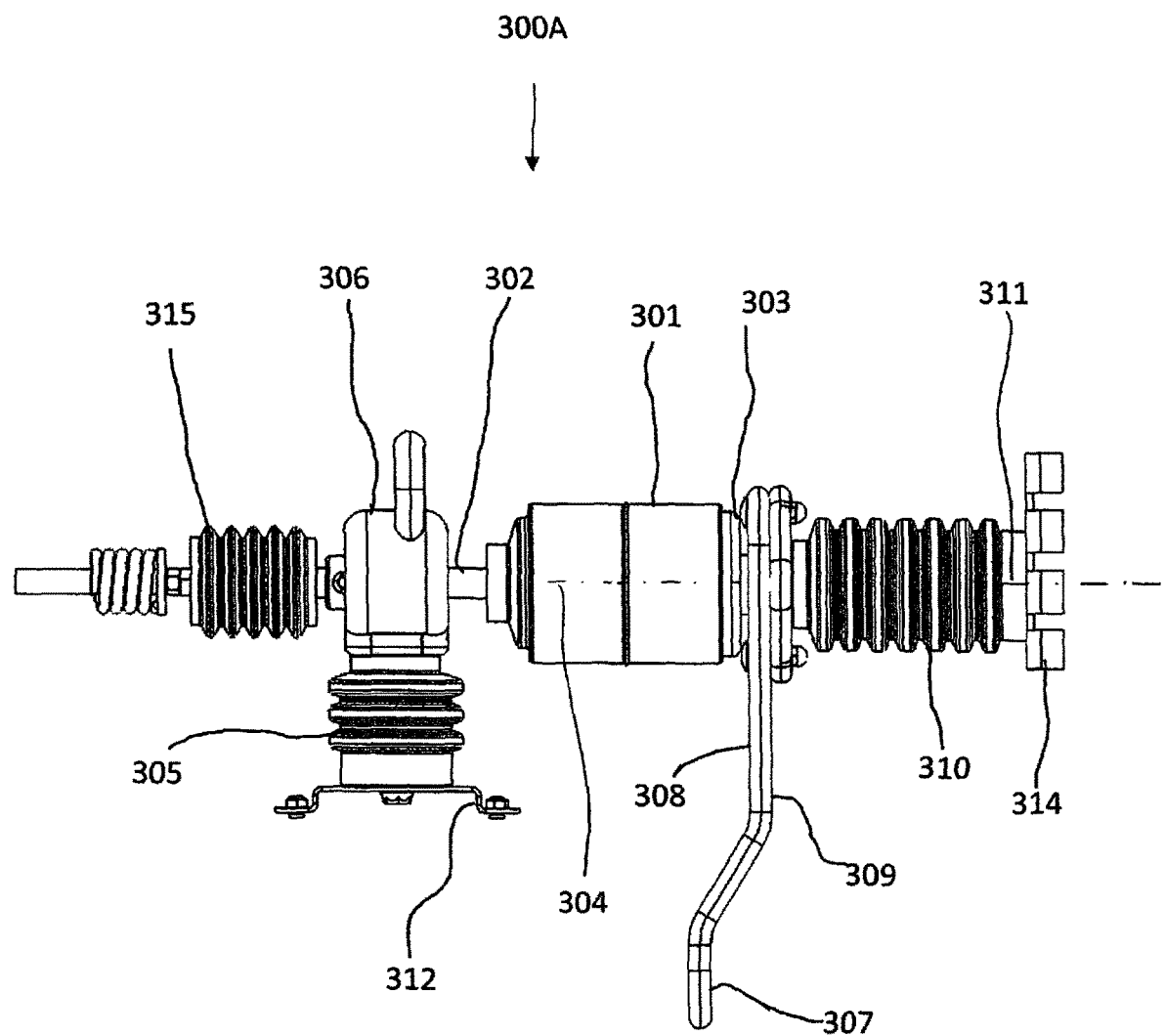
FIG. 13 shows a side view of a second embodiment of a circuit breaker.
Figure 14:
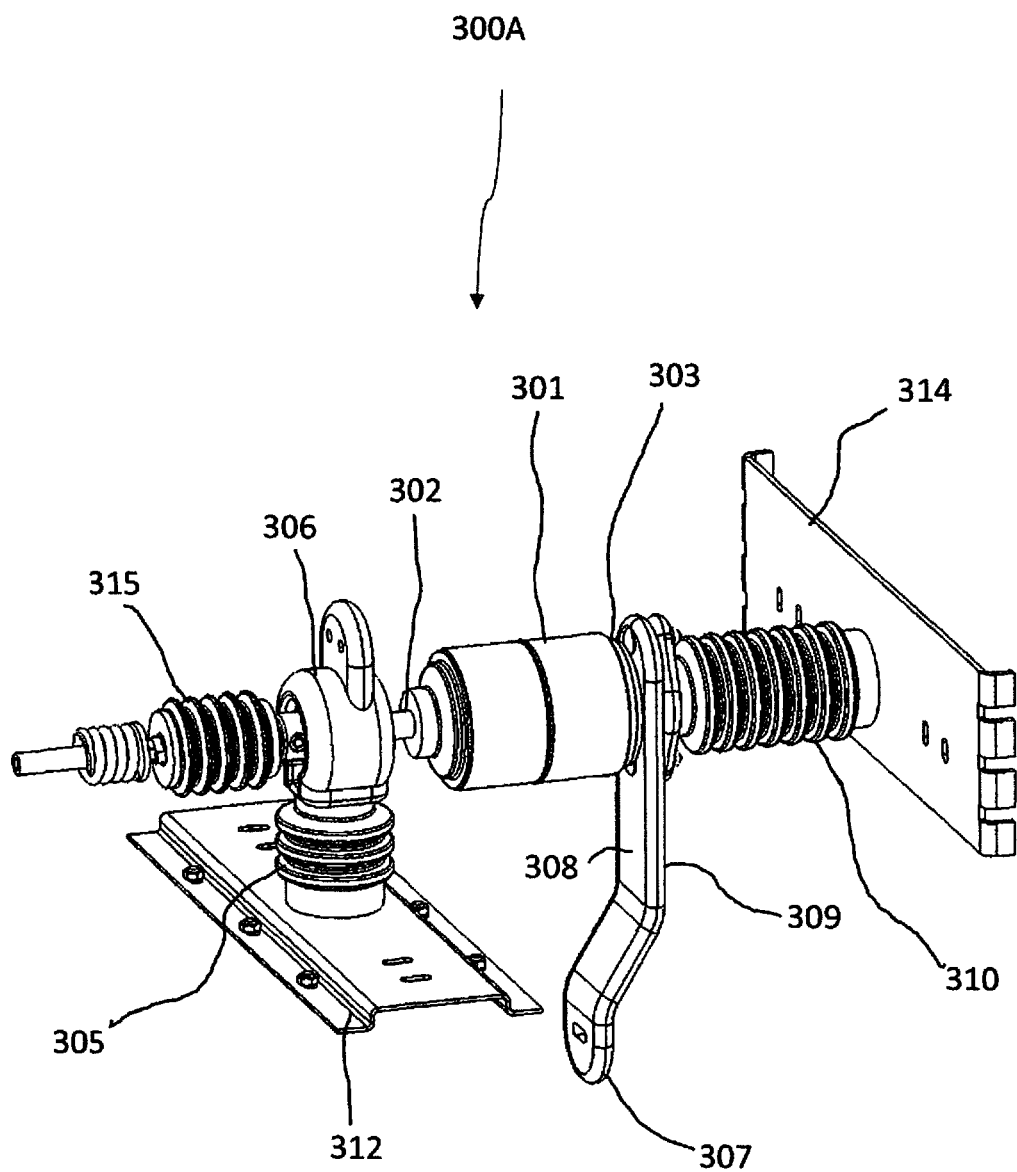
FIG. 14 shows a schematic view of the circuit breaker according to FIG. 13.
Figure 15:
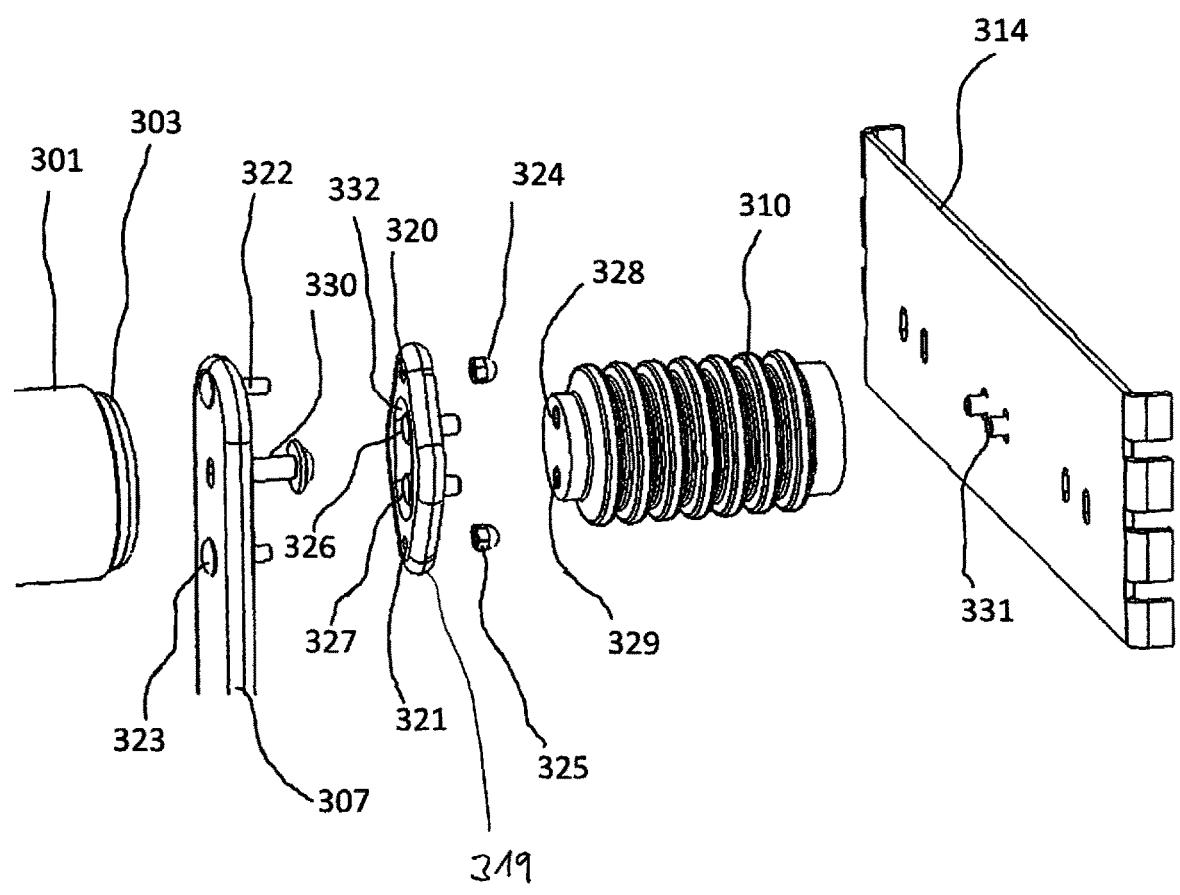
FIG. 15 shows a schematic view of the assembling of an insulator to a vacuum interrupter.

A second embodiment of the circuit breaker 300A is shown in FIGS. 13 to 15. The second embodiment of the circuit breaker 300A shown in FIGS. 13 to 15 is based on the first embodiment of the circuit breaker 300A shown in FIGS. 10 to 12. Identical reference signs refer to identical components. All of the aforementioned explanations with respect to the first embodiment of the circuit breaker 300A also apply to the second embodiment of the circuit breaker 300A as shown in FIGS. 13 to 15.

Rather than having a parallel alignment of the second center axis 311 of the second insulator 310 to the first center axis 304 of the vacuum interrupter 301, the second embodiment of the circuit breaker 300A shown in FIGS. 13 to 15 has a different alignment of the axes. The second center axis 311 of the second insulator 310 is collinear with the first center axis 304 of the vacuum interrupter 301 and, therefore, is also collinear with the fourth center axis of the insulating push rod 315.

As shown in FIG. 15, the second embodiment of the circuit breaker 300A comprises an intermediate plate 319 arranged between the busbar 307 and the second insulator 310. The intermediate plate 319 may be a metallic plate, in particular an aluminum plate, a steel plate and/or a copper plate. The intermediate plate 319 comprises a first through-opening 320 and a second through-opening 321. The busbar 307 comprises a first bolt 322 and a second bolt 323. The first bolt 322 is guided through the first through-opening 320 and is secured by a first nut 324 for arranging the intermediate plate 319 to the busbar 307. Moreover, the second bolt 323 is guided through the second through-opening 321 and is secured by a second nut 325 for arranging the intermediate plate 319 to the busbar 307.

The intermediate plate 319 comprises a first screw element 326 and a second screw element 327. Moreover, a first end of the second insulator 310 comprises a first opening 328 and a second opening 329 for inserting the first screw element 326 and the second screw element 327 into the second insulator 310 for arranging the intermediate plate 319 to the second insulator 310. In other words, the second insulator 310 is fixed and/or mounted to the intermediate plate 319 by the first screw element 326, the second screw element 327, the first opening 328 and the second opening 329. A second end of the second insulator 310 may be connected to the second support device 314 comprising screws 331 which are inserted into the second end of the second insulator 310.

The intermediate plate 319 also comprises a slot 332 into which a connecting means 330 is arranged. Therefore, the slot 332 provides space for the connecting means 330. The connecting means 330 is arranged at the busbar 307 and is connected to the second stationary contact 303 of the vacuum interrupter 301. In other words, the intermediate plate 319 is conductively and/or mechanically connected to the second stationary contact 303 of the vacuum interrupter 301. The connecting means 330 is an electrical conductor. The connecting means 330 may be any kind of connecting means suitable for the circuit breaker 300A according to the invention, such as a screw and/or a nut/bolt connection.

The second embodiment of the circuit breaker 300A according to the FIGS. 13 to 15 provides for a good support of the second stationary contact 303 of the vacuum interrupter 301. This is advantageous since a force of around 1,500 N or higher is often applied to the second stationary contact 303 of the vacuum interrupter 301.

As mentioned above, the disconnector unit 200 is connected to the circuit breaker unit 300 by the first electrical conducting unit 201, the second electrical conducting unit 202 and the third electrical conducting unit 203. The circuit breaker unit 300 comprises three circuit breakers 300A as described above. Each of the aforementioned conducting units 201, 202 and 203 are connected to one contact unit 306 of a circuit breaker 300A of the circuit breaker unit 300.

Figure 16:
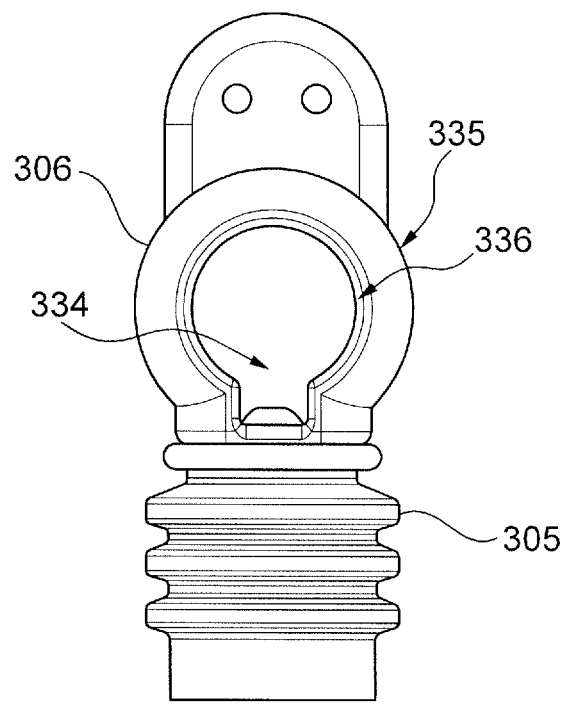
FIG. 16 shows a side view of a contact unit of an electrical contact system for a circuit breaker.
Figure 17:
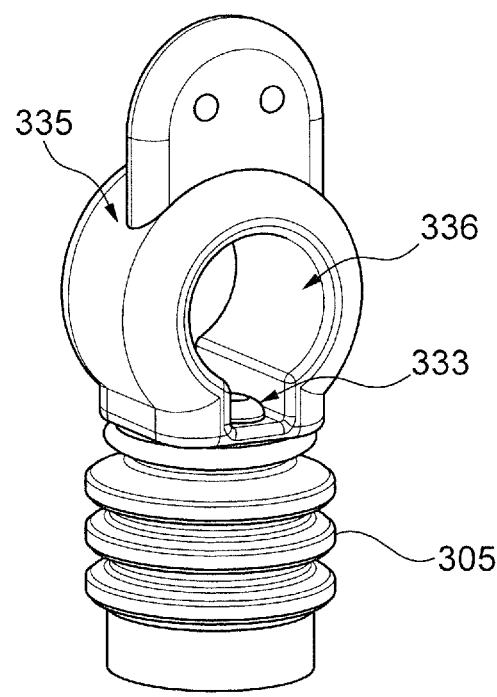
FIG. 17 shows a schematic view of the contact unit according to FIG. 16.

FIGS. 16 and 17 show views of the contact unit 306 which is also a part of an electrical contact system according to the invention. The contact unit 306 is arranged at the first insulator 305 using at least one mounting device 333. The mounting device 333 may be a mechanical fastener such as a bolt. The invention is not restricted to a mechanical fastener as the mounting device 333. Rather, any mounting device 333 which is suitable for the invention may be used.

The contact unit 306 comprises a cavity 334. The mounting device 333 is arranged inside the cavity 334. Moreover, the contact unit 306 comprises an inner contact surface 336 being adjacent to the cavity 334. The inner contact surface 336 surrounds the cavity 334. The contact unit 306 is electrically conductive. In particular, the inner contact surface 336 is electrically conductive. The contact unit 306 is made, for example, of copper and/or aluminum. However, the invention is not restricted to the aforementioned materials. Rather, any material for the contact unit 306 which is suitable for the invention may be used.

The contact unit 306 comprises an outer surface 335 having a cylindrical shape. The cylindrical shape of the outer surface 335 provides for a homogeneous electrical field distribution at the outer surface 335 of the contact unit 306. However, the shape of the outer surface 335 is not restricted to the cylindrical shape. Rather, the outer surface 335 may have any shape which provides for a homogeneous electrical field. In particular, the outer surface 335 may have an increased surface area which may increase a thermal dissipation capability.

Figure 18:
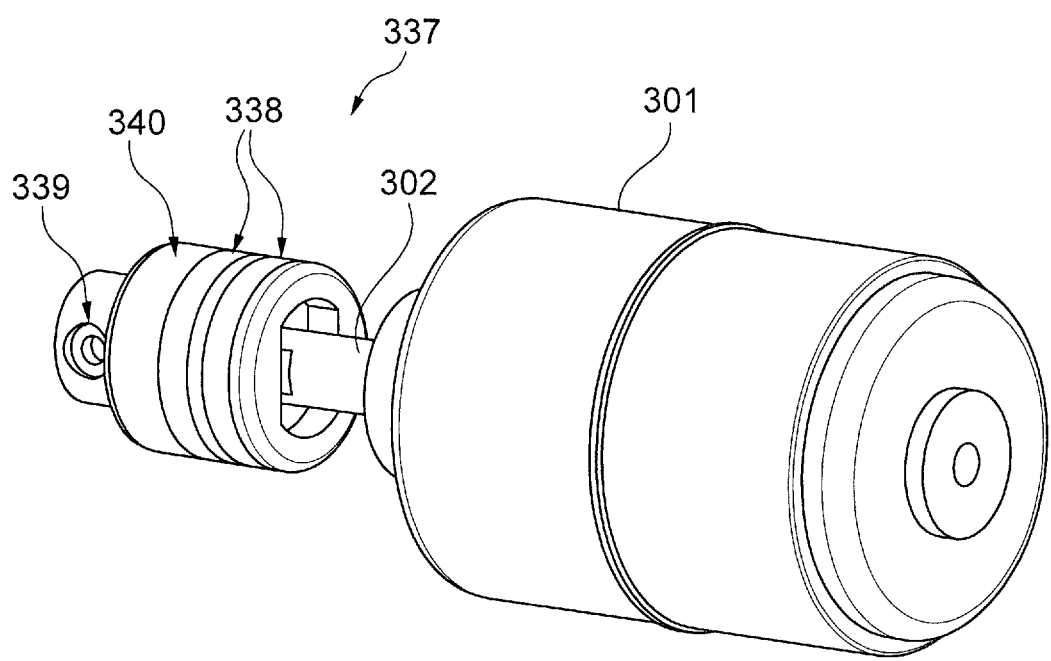
FIG. 18 shows a schematic view of a vacuum interrupter comprising a sliding contact unit of the electrical contact system.

FIG. 18 shows the vacuum interrupter 301 comprising the first movable contact 302. A sliding contact unit 337 is arranged at the first movable contact 302 of the vacuum interrupter 301. In particular, the sliding contact unit 337 is mounted at the first movable contact 302 of the vacuum interrupter 301 and is moved by the first movable contact 302 of the vacuum interrupter 301 into the cavity 334 of the contact unit 306. The sliding contact unit 337 may be mounted to the first movable contact 302 using mechanical fasteners. However, the invention is not restricted to mechanical fasteners. Rather, any mounting device may be used to arrange the sliding contact unit 337 to the first movable contact 302.

The sliding contact unit 337 is part of the electrical contact system according to the invention. The sliding contact unit 337 comprises an outer cylindrical surface 340. Two flexible contact units 338 are arranged at the outer cylindrical surface 340 for contacting the inner contact surface 336 of the contact unit 306. In particular, the sliding contact unit 337 may comprise cylindrical slots on which the flexible contact units 338 are arranged.

The flexible contact units 338 may be spring-loaded for high contact force and may comprise a silver or gold plating for increasing conductivity. The invention is not restricted to a specific number of flexible contact units 338. In fact, any number of flexible contact units 338 which is suitable for the invention may be used. FIG. 18 shows two flexible contact units 338.

The sliding contact unit 337 may comprise connection means 339 such as, for example, holes or slots, to connect the sliding contact unit 337 to a mechanical drive (not shown in the Figures).

The electrical contact system comprising the contact unit 306 and the sliding contact unit 337 provides for the first movable contact 302 to move in an axial direction to an opened position and to a closed position. When the flexible contact units 338 contact the inner contact surface 336, the electric contact is made. This is advantageous with respect to the prior art which typically uses a copper flexible unit to connect the first movable contact of a vacuum interrupter to a contact unit. However, such flexible units comprise sharp corners, surfaces and edges which lead to a very high electric field, in particular when using insulating gas. By providing the sliding contact unit 337 and, in particular, the flexible contact units 338 as described above, a high electric field is avoided.

Other embodiments of the invention will be apparent to those skilled in the art from a consideration of the specification and/or an attempt to put into practice the invention disclosed herein. It is intended that the specification and examples be considered as exemplary only, with the true scope and spirit of the invention being indicated by the following claims.

LIST OF REFERENCE SIGNS 100 gas insulated tank
200 disconnector unit
201 first electrical conducting unit
202 second electrical conducting unit
203 third electrical conducting unit
204 mounting unit
205 first disconnector insulator
206 second disconnector insulator
207 third disconnector insulator
208 first electrical conductor
209 second electrical conductor
210 third electrical conductor
211 first contact unit
212 second contact unit
213 third contact unit
214 first disconnector pole
215 second disconnector pole
216 third disconnector pole
217A first contact of first disconnector pole
217B second contact of second disconnector pole
217C third contact of third disconnector pole
218 metallic contact device
219 metallic housing
220A first part of first metallic contact unit
220B second part of first metallic contact unit
221A first part of second metallic contact unit
221B second part of second metallic contact unit
222A first part of third metallic contact unit
222B second part of third metallic contact unit
223 first holder
224 second holder
225 third holder
226 fourth holder
227 first spring unit
228 second spring unit
229 third spring unit
230 fourth spring unit
231 first groove
232 second groove
233 third groove
234 fourth groove
235A first middle section
235B second middle section
235C third middle section
236 first housing part
237 second housing part
238 opening
239 first wing unit
240 further first wing unit
241 second wing unit
242 further second wing unit
243 countersunk formation
244 screws 245 first cut-out
246 second cut-out
247 first countersunk formation
248 first chamfer
249 second countersunk formation
250 second chamfer
251 rod, in particular polymeric insulating rod
252 rotation axis
253 first main body
254 second main body
255 outer surface
256 outer surface
257 tip of blade
300 circuit breaker unit
300A circuit breaker
301 vacuum interrupter
302 first movable contact
303 second stationary contact
304 first center axis
305 first insulator
306 contact unit
307 busbar
308 first side of busbar
309 second side of busbar
310 second insulator
311 second center axis
312 third center axis
313 first support device
314 second support device
315 insulating push rod
316 screw
317 first screw
318 second screw
319 intermediate plate
320 first through-opening
321 second through-opening
322 first bolt
323 second bolt
324 first nut
325 second nut
326 first screw element
327 second screw element
328 first opening
329 second opening
330 connecting means
331 screws
332 slot
333 mounting device
334 cavity
335 outer surface
336 inner contact surface
337 sliding contact unit
338 flexible contact unit
339 connection means
340 outer cylindrical surface
1000 gas insulated switch gear

The invention claimed is:

1. A circuit breaker (300, 300A) for a gas insulated switch gear (1000), comprising:
   a vacuum interrupter (301) comprising a first movable contact (302), a second stationary contact (303) and a first center axis (304),
   a first insulator (305),
   a contact unit (306) arranged at the first insulator (305), wherein the first movable contact (302) is movable towards the contact unit (306) so as to be connected to the contact unit (306),
   an electrical conducting unit (307) comprising a first side (308) and a second side (309), wherein the first side (308) and the second side (309) are opposite to each other, wherein the vacuum interrupter (301) is arranged at the first side (308) of the electrical conducting unit (307),
   a second insulator (310), wherein the second insulator (310) is arranged at the second side (309) of the electrical conducting unit (307), wherein the second insulator (310) is mechanically connected to the second stationary contact (303), wherein the second insulator (310) has a second center axis (311), and wherein the second center axis (311) of the second insulator (310) is parallel to or collinear with the first center axis (304) of the vacuum interrupter (301).

2. The circuit breaker (300, 300A) according to claim 1, wherein the circuit breaker (300, 300A) has at least one of the following features:
   (i) the vacuum interrupter (301) is a cylindrical vacuum interrupter, wherein the first center axis (304) is a first cylindrical axis;
   (ii) the second insulator (310) is a cylindrical insulator, wherein the second center axis (311) is a second cylindrical axis.

3. The circuit breaker (300, 300A) according to claim 1, wherein the circuit breaker (300, 300A) has one of the following features:
   (i) the first insulator (305) has a third center axis (312) arranged perpendicular to the first center axis (304) of the vacuum interrupter (301) and to the second center axis (311) of the second insulator (310);
   (ii) the first insulator (305) is a cylindrical insulator, wherein the first insulator (305) has a third center axis (312) arranged perpendicular to the first center axis (304) of the vacuum interrupter (301) and to the second center axis (311) of the second insulator (310).

4. The circuit breaker (300, 300A) according to claim 3, wherein the circuit breaker (300, 300A) has the following features:
   the first center axis (304) of the vacuum interrupter (301) and the second center axis (311) of the second insulator (310) are aligned horizontally, and wherein
   the third center axis (312) of the first insulator (305) is aligned vertically.

5. The circuit breaker (300, 300A) according to claim 1, wherein the circuit breaker (300, 300A) has at least one of the following features:
   (i) the first insulator (305) is arranged at a first support device (313);
   (ii) the second insulator (310) is arranged at a second support device (314).

6. The circuit breaker (300, 300A) according to claim 1, wherein the circuit breaker (300, 300A) comprises one of the following features:
   (i) the contact unit (306) is arranged at an insulating push rod (315);
   (ii) the contact unit (306) is arranged at an insulating push rod (315) having a fourth center axis, wherein the fourth center axis is parallel to the second center axis (311) of the second insulator (310);
   (iii) the contact unit (306) is arranged at an insulating push rod (315) having a fourth center axis, wherein the fourth center axis is parallel to the first center axis (304) of the vacuum interrupter (301);
   (iv) the contact unit (306) is arranged at an insulating push rod (315) having a fourth center axis, wherein the fourth center axis is collinear with the second center axis (311) of the second insulator (310);

(v) the contact unit (306) is arranged at an insulating push rod (315) having a fourth center axis, wherein the fourth center axis is collinear with the first center axis (304) of the vacuum interrupter (301).

7. The circuit breaker (300, 300A) according to claim 1, wherein an intermediate plate (319) is arranged between the electrical conducting unit (307) and the second insulator (310).

8. The circuit breaker (300, 300A) according to claim 7, wherein
the intermediate plate (319) comprises at least one through-opening (320, 321), and wherein
the electrical conducting unit (307) comprises at least one first connecting means (322, 323) guided through the through-opening (320, 321) for arranging the intermediate plate (319) to the electrical conducting unit (307).

9. The circuit breaker (300, 300A) according to claim 7, wherein
the intermediate plate (319) comprises at least one second connecting means (326, 327), and wherein
the second insulator (310) comprises at least one opening (328, 329) for inserting the second connecting means (326, 327) into the second insulator (310) for arranging the intermediate plate (319) to the second insulator (310).

10. The circuit breaker (300, 300A) according to claim 7, wherein the intermediate plate (319) comprises at least one slot (332) and a third connecting means (330) which is arranged in the slot (332) and which is connected to the second stationary contact (303) of the vacuum interrupter (301).

11. The circuit breaker (300, 300A) according to claim 10, wherein the third connecting means (330) is an electrical conductor.

12. The circuit breaker (300, 300A) according to claim 1, wherein the circuit breaker (300, 300A) comprises at least one of the following features:
(i) the contact unit (306) is a metallic contact unit;
(ii) the first movable contact (302) is a metallic first movable contact;
(iii) the second stationary contact (303) is a metallic stationary contact;
(iv) the electrical conducting unit (307) is a metallic conductor.

13. The circuit breaker (300, 300A) according to claim 1, wherein
the vacuum interrupter (301) comprises a body arranged between the first movable contact (302) and the second stationary contact (303), and wherein
no polymeric support or polymeric component is arranged at the body of the vacuum interrupter (301).

14. An electrical contact system (306, 337) for a circuit breaker (300, 300A) having a vacuum interrupter (301) with a first movable contact (302), in particular the circuit breaker (300, 300A) according to claim 1, comprising
a contact unit (306) having at least one cavity (334) and at least one inner contact surface (336) being adjacent to the cavity (334), wherein the inner contact surface (336) surrounds at least partially the cavity (334); and
a sliding contact unit (337) for electrical contact with the contact unit (306), wherein the sliding contact unit (337) comprises an outer cylindrical surface (340), wherein at least one flexible contact unit (338) is arranged at the outer cylindrical surface (340) for contacting the inner contact surface (336), wherein the sliding contact unit (337) is arranged at the first movable contact (302) of the vacuum interrupter (301).

15. The electrical contact system (306, 337) according to claim 14, wherein the contact unit (306) comprises at least one outer surface (335) being at least one of: cylindrical shape, spherical shape and oval shape.

16. A gas insulated switchgear assembly (1000) comprising at least one circuit breaker (300, 300A) according to claim 1.

17. The gas insulated switchgear (1000) according to claim 16, wherein the gas insulated switchgear (1000) comprises three circuit breakers (300, 300A).

18. The gas insulated switchgear assembly (1000) according to claim 16, further comprising at least one electrical contact system according to claim 14.

19. The gas insulated switchgear assembly (1000) according to claim 16, further comprising at least one electrical contact system according to claim 15.

* * * * *